(12) United States Patent
Sawai

(10) Patent No.: US 9,999,085 B2
(45) Date of Patent: *Jun. 12, 2018

(54) COMMUNICATION CONTROL DEVICE, COMMUNICATION CONTROL METHOD, COMMUNICATION SYSTEM AND COMMUNICATION DEVICE

(71) Applicant: Sony Corporation, Tokyo (JP)

(72) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 15/167,555

(22) Filed: May 27, 2016

(65) Prior Publication Data

US 2016/0278157 A1 Sep. 22, 2016

Related U.S. Application Data

(63) Continuation of application No. 14/696,941, filed on Apr. 27, 2015, now Pat. No. 9,380,575, which is a
(Continued)

(30) Foreign Application Priority Data

| Jul. 7, 2010 | (JP) | 2010-155116 |
| Oct. 29, 2010 | (JP) | 2010-243789 |
| Feb. 15, 2011 | (JP) | 2011-029988 |

(51) Int. Cl.
*H04W 72/04* (2009.01)
*H04W 76/02* (2009.01)
(Continued)

(52) U.S. Cl.
CPC ......... *H04W 76/026* (2013.01); *H04W 16/14* (2013.01); *H04W 24/02* (2013.01);
(Continued)

(58) Field of Classification Search
CPC ..... H04W 72/04; H04W 16/14; H04W 48/16; H04W 8/22; H04L 41/12
See application file for complete search history.

(56) References Cited

U.S. PATENT DOCUMENTS

| 5,749,044 A | 5/1998 | Natarajan et al. |
| 7,495,608 B1 * | 2/2009 | Chen ............... G01S 19/06 |
| | | 342/357.43 |

(Continued)

OTHER PUBLICATIONS

Baykas, T. et al., "Wireless Coexistence: System Design Document," IEEE P802.19, doc.: IEEE 802. 19-10/0055r3, pp. 1-15, (Mar. 2010).

(Continued)

*Primary Examiner* — Bobbak Safaipour
(74) *Attorney, Agent, or Firm* — Wolf, Greenfield & Sacks, P.C.

(57) ABSTRACT

Provided is a communication control device controlling communication of multiple secondary usage nodes providing second communication services using a part of a frequency band assigned to a first communication service, including a communication unit receiving service area information for estimating service areas of the second communication services provided by the secondary usage nodes and access technique information indicating radio access techniques usable by the secondary usage nodes, a storage unit storing information on the service area and access technique received by the communication unit, an estimation unit estimating service areas of multiple second communication services, and a control unit notifying a secondary usage node providing one of the multiple second communication services of a radio access technique or a channel recommended to the at least one second communication service on the
(Continued)

basis of a location relationship between the service areas estimated by the estimation unit and the access technique information.

17 Claims, 16 Drawing Sheets

Related U.S. Application Data continuation of application No. 13/807,898, filed as application No. PCT/JP2011/063657 on Jun. 15, 2011, now Pat. No. 9,078,243.

(51) Int. Cl.
*H04W 16/14* (2009.01)
*H04W 48/08* (2009.01)
*H04W 24/02* (2009.01)
*H04W 8/22* (2009.01)
*H04W 48/16* (2009.01)
*H04W 64/00* (2009.01)
*H04W 88/12* (2009.01)

(52) U.S. Cl.
CPC .......... *H04W 48/08* (2013.01); *H04W 72/04* (2013.01); *H04W 72/0433* (2013.01); *H04W 76/16* (2018.02); *H04W 8/22* (2013.01); *H04W 48/16* (2013.01); *H04W 64/00* (2013.01); *H04W 72/0453* (2013.01); *H04W 88/12* (2013.01)

(56) References Cited

U.S. PATENT DOCUMENTS

| | | | |
|---|---|---|---|
| 8,249,631 B2 | 8/2012 | Sawai | |
| 8,265,684 B2 | 9/2012 | Sawai | |
| 8,401,478 B2* | 3/2013 | Kwak | H04W 16/14 348/731 |
| 8,577,406 B2 | 11/2013 | Sawai et al. | |
| 8,588,829 B2 | 11/2013 | Sawai | |
| 8,639,281 B2 | 1/2014 | Sawai et al. | |
| 9,078,243 B2* | 7/2015 | Sawai | H04W 16/14 |
| 9,131,387 B2 | 9/2015 | Sawai et al. | |
| 9,137,761 B2 | 9/2015 | Sawai | |
| 9,215,670 B2 | 12/2015 | Sawai et al. | |
| 9,363,767 B2 | 6/2016 | Kimura et al. | |
| 9,380,575 B2* | 6/2016 | Sawai | H04W 16/14 |
| 9,510,302 B2 | 11/2016 | Sawai et al. | |
| 9,622,191 B2 | 4/2017 | Kimura et al. | |
| 9,661,587 B2 | 5/2017 | Sawai | |
| 9,775,119 B2 | 9/2017 | Sawai et al. | |
| 9,820,168 B2 | 11/2017 | Sawai et al. | |
| 2007/0253394 A1 | 11/2007 | Horiguchi et al. | |
| 2008/0069033 A1* | 3/2008 | Li | H04W 48/16 370/328 |
| 2008/0076450 A1 | 3/2008 | Nanda et al. | |
| 2009/0011788 A1 | 1/2009 | Shan et al. | |
| 2009/0034508 A1 | 2/2009 | Gurney et al. | |
| 2009/0135744 A1* | 5/2009 | Chaudhri | H04W 16/14 370/278 |
| 2010/0081449 A1* | 4/2010 | Chaudhri | H04W 72/082 455/452.2 |
| 2010/0238798 A1* | 9/2010 | Ahuja | H04L 41/0681 370/225 |
| 2011/0013571 A1* | 1/2011 | Sawai | H04W 16/14 370/329 |
| 2011/0028170 A1 | 2/2011 | Sawai | |
| 2011/0028179 A1 | 2/2011 | Sawai et al. | |
| 2011/0028180 A1 | 2/2011 | Sawai | |
| 2011/0034204 A1 | 2/2011 | Sawai et al. | |
| 2012/0309439 A1 | 12/2012 | Sawai | |
| 2013/0100893 A1* | 4/2013 | Sawai | H04W 16/14 370/328 |
| 2013/0102344 A1 | 4/2013 | Sawai | |
| 2013/0102350 A1 | 4/2013 | Sawai et al. | |
| 2013/0217429 A1 | 8/2013 | Kimura et al. | |
| 2013/0316756 A1 | 11/2013 | Sawai et al. | |
| 2014/0045542 A1 | 2/2014 | Sawai | |
| 2015/0230243 A1 | 8/2015 | Sawai | |
| 2015/0334664 A1 | 11/2015 | Sawai et al. | |
| 2015/0351045 A1 | 12/2015 | Sawai | |
| 2016/0073356 A1 | 3/2016 | Sawai et al. | |
| 2016/0337983 A1 | 11/2016 | Sawai | |
| 2016/0366653 A1 | 12/2016 | Sawai et al. | |
| 2017/0086145 A1 | 3/2017 | Sawai | |
| 2017/0188365 A1 | 6/2017 | Kimura et al. | |

OTHER PUBLICATIONS

Sawai, R. et al., "Wireless Coexistence: Coexistence Mechanism and its Algorithm," IEEE P802.19, doc. IEEE 802.19-10/0145r0, pp. 1-33, (Nov. 2010).
Villardi, G. P. et al., "Coexistence of Multiple Secondary Networks in TVWS (Distributed Beason Approach)" doc. IEEE 802.19-10/0072r0, pp. 1-16, (May 2010).
U.S. Appl. No. 12/838,605, filed Jul. 19, 2010, Sawai et al.
U.S. Appl. No. 12/840,809, filed Jul. 21, 2010, Sawai.
U.S. Appl. No. 12/840,831, filed Jul. 21, 2010, Sawai.
U.S. Appl. No. 12/844,188, filed Jul. 27, 2010, Sawai et al.
U.S. Appl. No. 12/849,210, filed Aug. 3, 2010, Sawai et al.
U.S. Appl. No. 13/587,312, filed Aug. 16, 2012, Sawai.
U.S. Appl. No. 13/655,002, filed Oct. 18, 2012, Sawai et al.
U.S. Appl. No. 13/807,825, filed Dec. 31, 2012, Sawai.
U.S. Appl. No. 13/807,898, filed Dec. 31, 2012, Sawai.
U.S. Appl. No. 13/880,963, filed Apr. 22, 2013, Kimura et al.
U.S. Appl. No. 13/954,609, filed Jul. 30, 2013, Sawai et al.
U.S. Appl. No. 14/049,328, filed Oct. 9, 2013, Sawai.
U.S. Appl. No. 14/463,850, filed Aug. 20, 2014, Sawai.
U.S. Appl. No. 14/696,941, filed Apr. 27, 2015, Sawai.
U.S. Appl. No. 14/810,825, filed Jul. 28, 2015, Sawai et al.
U.S. Appl. No. 14/824,701, filed Aug. 12, 2015, Sawai.
U.S. Appl. No. 14/942,891, filed Nov. 16, 2015, Sawai et al.
U.S. Appl. No. 15/688,081, filed Aug. 28, 2017, Sawai et al.
U.S. Appl. No. 15/703,247, filed Sep. 13, 2017, Sawai et al.

\* cited by examiner

CLASS A

CLASS B

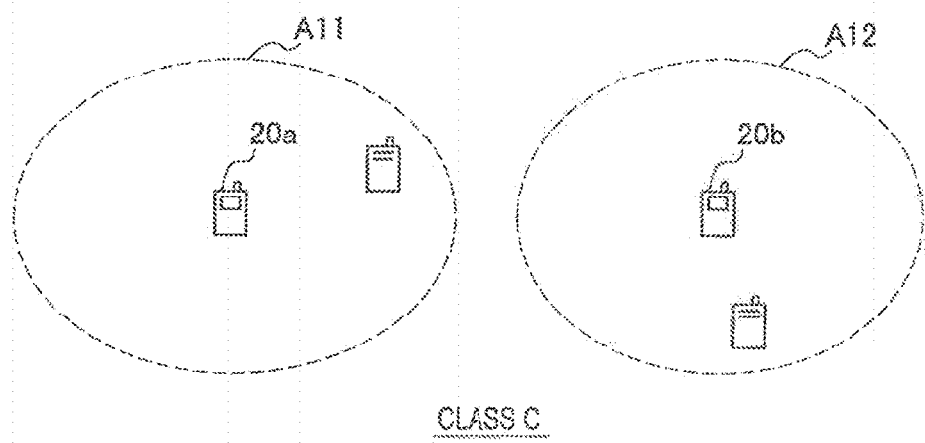

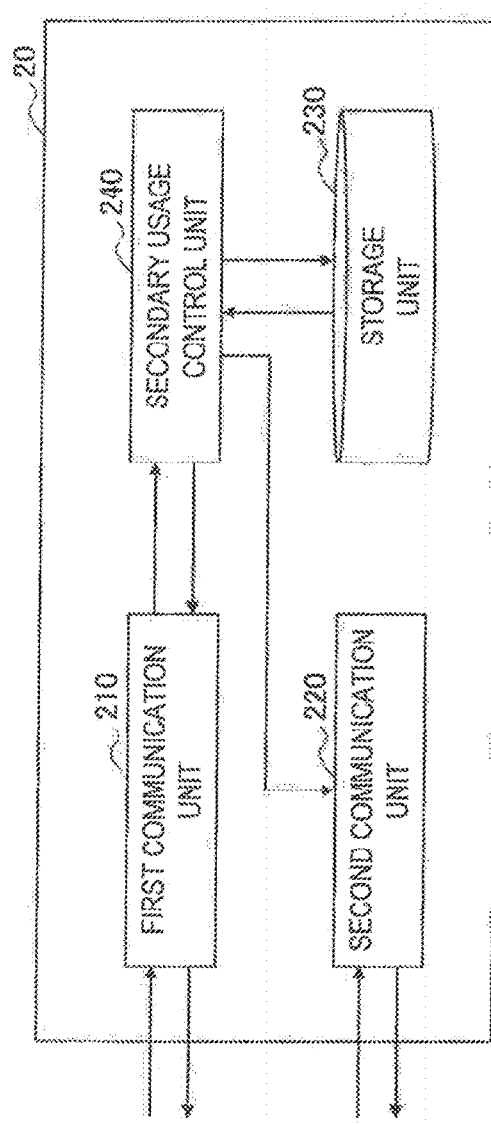

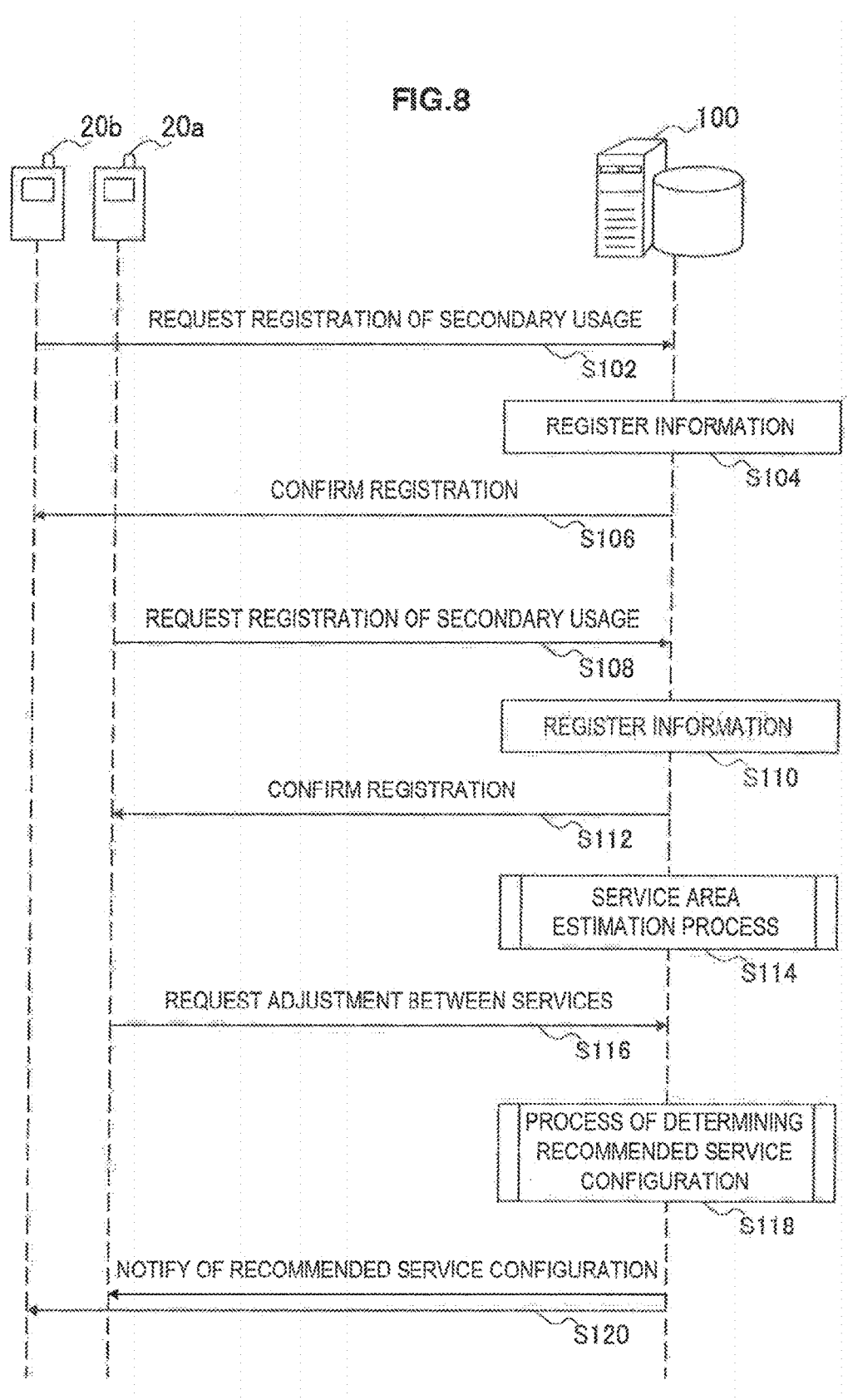

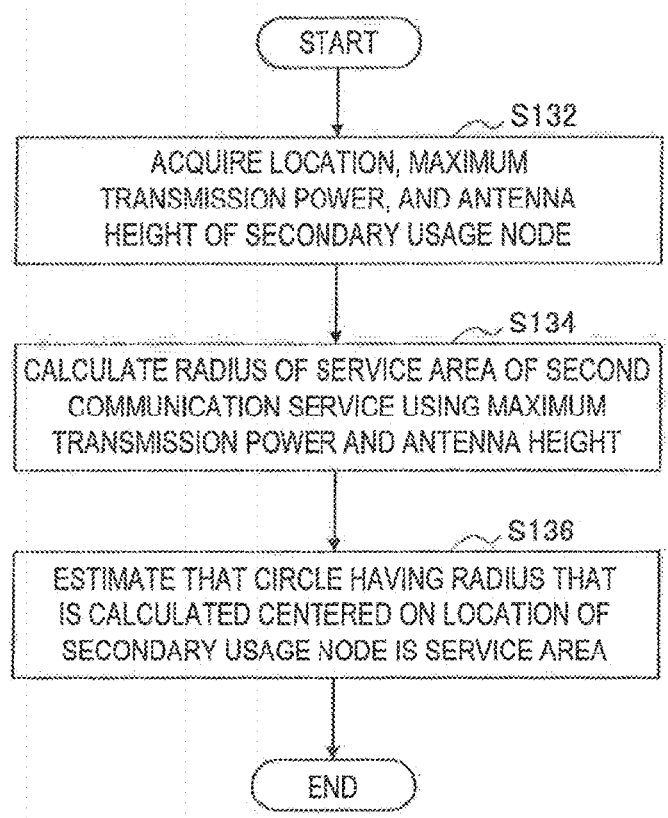

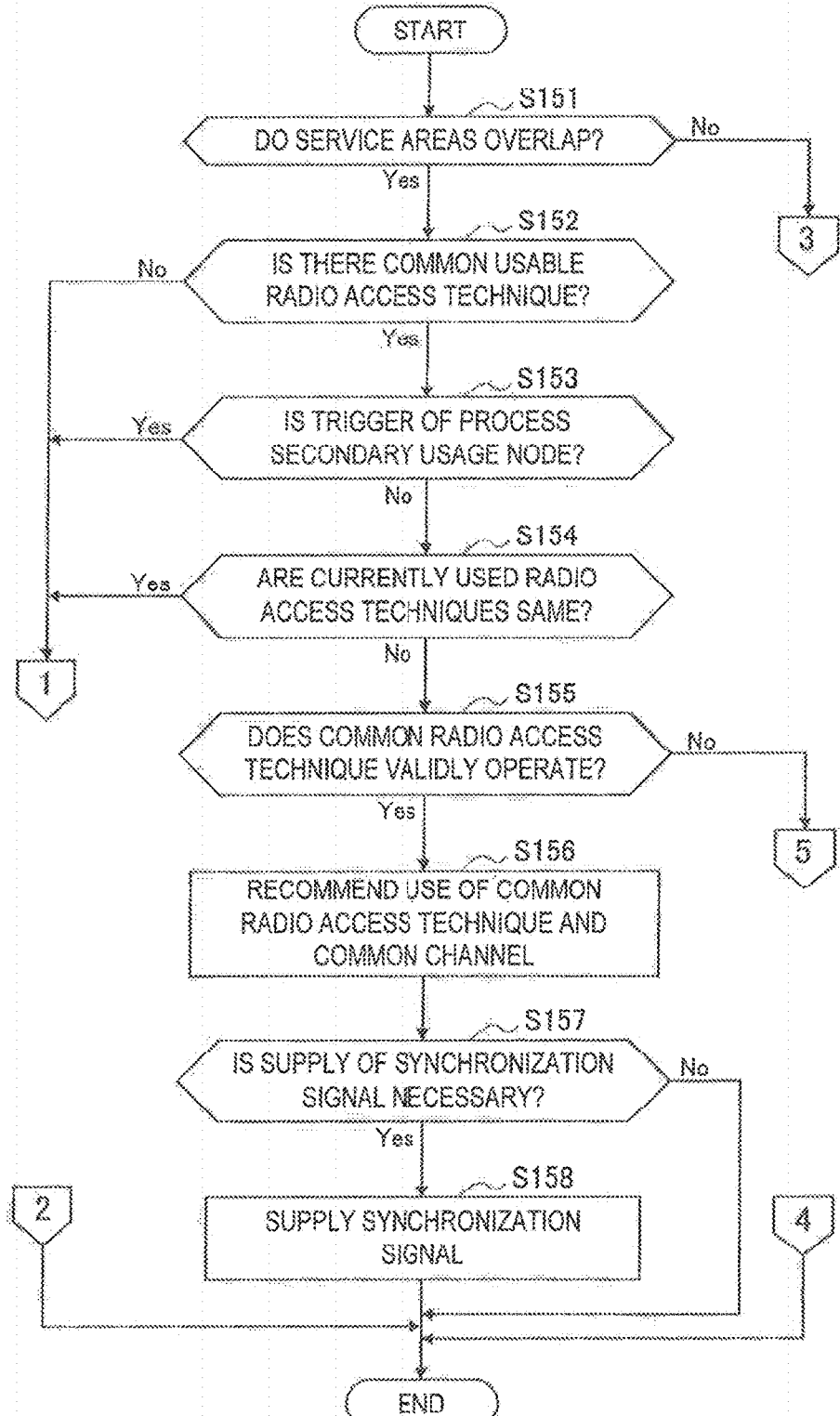

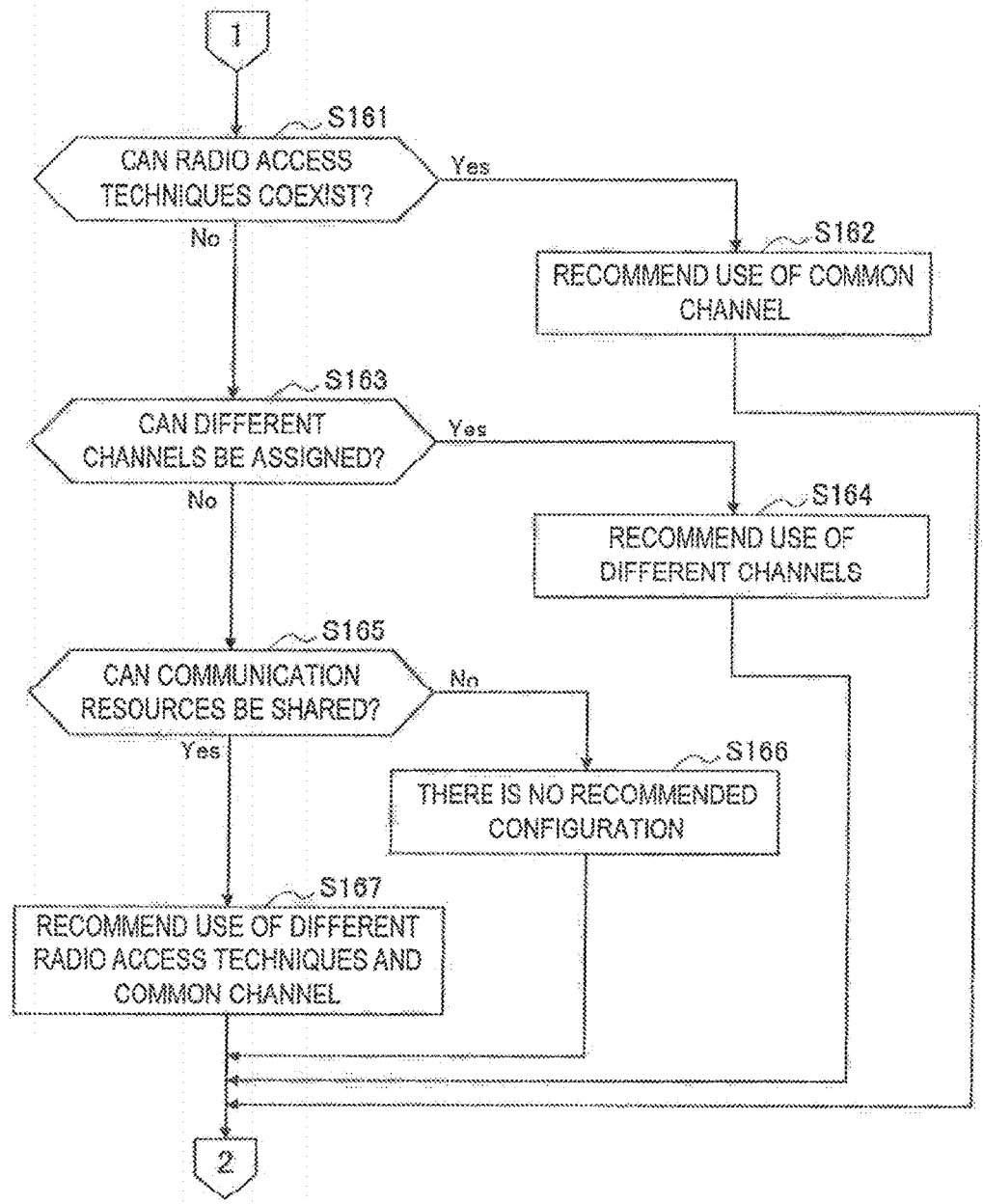

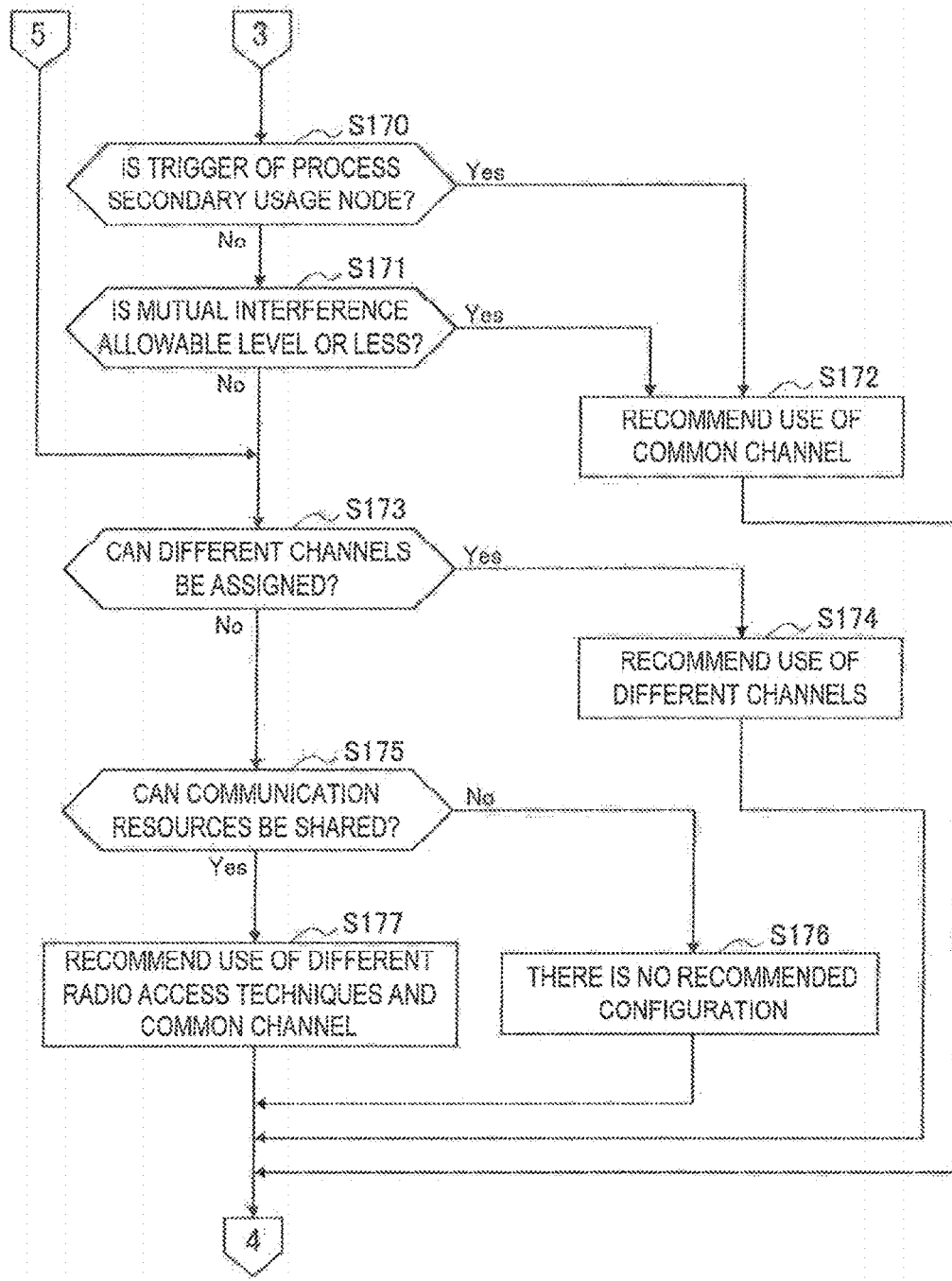

COMMUNICATION CONTROL DEVICE, COMMUNICATION CONTROL METHOD, COMMUNICATION SYSTEM AND COMMUNICATION DEVICE

CROSS REFERENCE TO RELATED APPLICATIONS

This is a continuation of and claims the benefit under 35 U.S.C. § 120 of U.S. patent application Ser. No. 14/696,941, titled "COMMUNICATION CONTROL DEVICE, COMMUNICATION CONTROL METHOD, COMMUNICATION SYSTEM AND COMMUNICATION DEVICE," filed on Apr. 27, 2015, which is a continuation of and claims the benefit under 35 U.S.C. § 120 of U.S. patent application Ser. No. 13/807,898, titled "COMMUNICATION CONTROL DEVICE, COMMUNICATION CONTROL METHOD, COMMUNICATION SYSTEM AND COMMUNICATION DEVICE," filed on Dec. 31, 2012, now U.S. Pat. No. 9,078,243, which is a U.S. National Stage Application under 35 U.S.C. § 371, based on International Application No. PCT/JP2011/063657, filed Jun. 15, 2011, which claims priority to Japanese Patent Applications JP 2011-029988, filed on Feb. 15, 2011, JP 2010-243789, filed Oct. 29, 2010, and JP 2010-155116, filed Jul. 7, 2010, each of which is hereby incorporated by reference in its entirety.

TECHNICAL FIELD

The present invention relates to a communication control device, a communication control method, a communication system and a communication device.

BACKGROUND ART

Recently, discussions for enabling a primarily used frequency band (spectrum) to be used in a second communication service according to the use condition of the frequency band have been in progress. For example, a standard specification for allowing an unused channel (TV white space) included in the frequency band of US digital TV broadcasting to be available for radio communication is under examination in IEEE802.22 working group (see Non-Patent Literature 1 below).

According to a recommendation of the Federal Communications Commission (FCC) on November 2008, the discussions have been directed toward permitting secondary usage of the TV white space by using a communication device that fulfills a predetermined condition and has received an authentication. This recommendation of FCC accepts the standard specification of IEEE802.22, which is the first standardization of secondary usage of the TV white space, and also covers the activities of a new study group in IEEE. Technically, since it is necessary to perform signal detection at a level of −114 [dBm](SNR is about −19 [dB] when Noise Figure (NF) is 11 [dB], for example) using existing technology for example, an auxiliary function such as Geo-location Database Access is expected to be necessary (see Non-Patent Literature 2 below). Also, FCC is under examination for opening a 250-MHz band, which is a part of a 5-GHz band, as a new channel for secondary usage.

Furthermore, in the EU, there are moves afoot to universally allocate a dedicated control channel referred to as Cognitive Pilot Channel (CPC) for implementing Dynamic Spectrum Access (DSA) under a long-term strategy. Allocation of CPC has been incorporated in the agenda of International Telecommunication Union (ITU)-WP11 in 2011. Technological studies for a secondary usage system that performs DSA are also under way in the IEEE Standards Coordinating Committee (SCC) 41.

In general, when a frequency band assigned to a communication service related to primary usage (will be referred to as a first communication service below) is secondarily used, it is important that a communication service related to secondary usage (will be referred to as a second communication service below) not interfere with the first communication service. For this reason, Non-Patent Literature 2 below recommends installation of a data server that receives administrator information, location information, and the like from a secondary usage node which will provide a second communication service and accumulates these pieces of information in a database. In this case, the data server specifies a channel that can be provided for secondary usage according to a request from the secondary usage node, and notifies the secondary usage node of the specified channel. When the secondary usage node uses the channel notified in this way by the data server, interference with a first communication service is prevented.

CITATION LIST

Non-Patent Literature

Non-Patent Literature 1: "IEEE802.22 WG on WRANs," [online], [searched Jul. 1, 2010], Internet <URL: http://www.ieee802.org/22/>

Non-Patent Literature 2: "SECOND REPORT AND ORDER AND MEMORANDUM OPINION AND ORDER," [online], [searched Jul. 1, 2010], Internet <URL: http://hraunfoss.fcc.gov/edocs_public/attachmatch/FCC-08-260A1.pdf>

SUMMARY OF INVENTION

Technical Problem

However, when only the aforementioned information provided by the data server is used, there are a plurality of secondary usage nodes, and there is still a risk that a problem such as interference, signal collision, or the like between second communication services will occur in a situation in which the plurality of second communication services can be provided. Also, when a plurality or second communication services are separately provided without cooperation with each other, it is difficult to achieve high efficiency in frequency usage. Accordingly, it is preferable for respective second communication services to be provided after configurations for secondary usage such as radio access techniques, channels, and the like are mutually adjusted.

Here, technology related to the present disclosure provides a new and improved communication control device, communication control method, communication system, and communication device that enable an adjustment of a configuration for secondary usage between a plurality of second communication services.

Solution to Problem

According to an embodiment of the present disclosure, there is provided a communication control device which controls communication of one or more secondary usage nodes providing second communication services using a part of a frequency band assigned to a first communication service, the communication control device, including a communication unit that receives service area information for estimating service areas of the second communication services provided by the secondary usage nodes and access technique information indicating radio access techniques usable by the secondary usage nodes from the respective secondary usage nodes, a storage unit that stores the service area information and the access technique information received by the communication unit, an estimation unit that estimates service areas of two or more second communication services using the service area information, and a control unit that notifies a secondary usage node providing at least one of the two or mote second communication services of a radio access technique or a channel recommended to the at least one second communication service on the basis of a location relationship between the service areas estimated by the estimation unit and the access technique information.

The service area information may include data about a location of a secondary usage node providing the corresponding second communication service, a maximum transmission power applied to the secondary usage node, and an antenna height of the secondary usage node.

The communication unit may further receive permissible channel information indicating a channel that the secondary usage node is allowed to use from the secondary usage node, and the control unit may select a channel recommended to each secondary usage node from among channels indicated by the permissible channel information received from the secondary usage node.

The control unit may recommend use of the same radio access technique, when service areas of two second communication services overlap and radio access techniques usable by two secondary usage nodes respectively providing the two second communication services are the same.

The control unit may cause the communication unit to transmit a synchronization signal to the two secondary usage nodes, when one of the two second communication nodes is not included in a service area of the other second communication service.

The control unit may recommend that a secondary usage node providing one of the second communication services use a channel different from a channel used by the other second communication service, when service areas of two second communication services overlap and radio access techniques usable by two secondary usage nodes respectively providing the two second communication services are different.

The control unit may recommend that two secondary usage nodes respectively providing the two second communication services use a common channel, when service areas of two second communication services do not overlap and a level of mutual interference between the two second communication services does not exceed an allowable interference level.

The control unit may notify the secondary usage node or another secondary usage node whose service area overlaps a service area of the secondary usage node of a recommended radio access technique or a recommended channel, according to a request from a secondary usage node detecting interference between second communication services.

The control unit may notify the secondary usage node or another secondary usage node capable of using the same radio access technique as the secondary usage node of a recommended radio access technique or a recommended channel, according to a request from a secondary usage node requesting expansion of a service area.

The control unit may notify the secondary usage node of a recommended channel, according to a request from a secondary usage node requesting expansion of a band.

The control unit may preferentially recommend a channel whose transmission power has no limitation, when there are a plurality of recommendable channels.

Further, according to another embodiment of the present disclosure, there is provided a communication control method for controlling communication of one or more secondary usage nodes providing second communication services using a part of a frequency band assigned to a first communication service, the communication control method, including receiving service area information for estimating service areas of the second communication services provided by the secondary usage nodes and access technique information indicating radio access techniques usable by the secondary usage nodes from the respective secondary usage nodes, storing the received service area information and access technique information, estimating service areas of two or more second communication services using the service area information, and notifying a secondary usage node providing at least one of the two or more second communication services of a radio access technique or a channel recommended to the at least one second communication service on the basis of a location relationship between the estimated service areas and the access technique information.

Further, according to another embodiment of the present disclosure, there is provided a communication system which includes one or more secondary usage nodes providing second communication services using a part of a frequency band assigned to a first communication service and a communication control device controlling communication of the one or more secondary usage nodes. The communication control device includes a communication unit that receives service area information for estimating service areas of the second communication services provided by the secondary usage nodes and access technique information indicating radio access techniques usable by the secondary usage nodes from the respective secondary usage nodes, a storage unit that stores the service area information and the access technique information received by the communication unit, an estimation unit that estimates service areas of two or more second communication services using the service area information, and a control unit that notifies a secondary usage node providing at least one of the two or more second communication services of a radio access technique or a channel recommended to the at least one second communication service on the basis of a location relationship between the service areas estimated by the estimation unit and the access technique information. Each of the secondary usage nodes includes a communication unit that transmits the service area information and the access technique information to the communication control device, and a secondary usage control unit that provides a second communication service to one or more terminal devices using the radio access technique or the channel recommended by the communication control device.

Further, according to another embodiment of the present disclosure, there is provided a communication device which provides a second communication service using a part of a frequency band assigned to a first communication service, the communication device including a communication unit that transmits service area information for estimating a service area of the second communication service provided by the communication device and access technique information indicating a radio access technique usable by the communication device to another device, and a secondary usage control unit that provides the second communication service to one or more terminal devices using a radio access technique or a channel recommended by the other device on the basis of a location relationship between a service area of the second communication service estimated using the service area information and a service area of another second communication service and the access technique information.

Advantageous Effects of Invention

As described above, the communication control device, the communication control method, the communication system, and the communication device related to the present disclosure enable an adjustment of a configuration for secondary usage between a plurality of second communication services.

BRIEF DESCRIPTION OF DRAWINGS

FIG. 6 is an explanatory diagram illustrating a third example of a location relationship between a second communication service and a service area.

FIG. 7 is a block diagram showing an example of a configuration of a secondary usage node related to one embodiment.

FIG. 8 is a sequence diagram showing an example of the flow of a communication control process between a communication control device and a secondary usage node related to one embodiment.

FIG. 9 is a flowchart showing an example of the flow of a service area estimation process related to one embodiment.

FIG. 10A is a first part of a flowchart showing an example of the flow of a process of determining a recommended service configuration related to one embodiment.

FIG. 10B is a second part of the flowchart showing an example of the flow of the process of determining a recommended service configuration related to one embodiment.

FIG. 10C is a third part of the flowchart showing an example of the flow of the process of determining a recommended service configuration related to one embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Embodiments for Implementing Invention" will be described according to the following sequence.

1. Outline of System
2. Example of Configuration of Device Related to One Embodiment
  2-1. Example of Configuration of Communication Control Device
  2-2. Example of Location Relationship Between Service Areas
  2-3. Example of Configuration of Secondary Usage Node
3. Flow of Process Related to One Embodiment
  3-1. Communication Control Process
  3-2. Service Area Determination Process
  3-3. Process of Determining Recommended Service Configuration
4. Typical Scenarios for Communication Control
  4-1. First Scenario
  4-2. Second Scenario
  4-3. Third Scenario
  4-4. Fourth Scenario
  4-5. Fifth Scenario
5. Summarization <1. Outline of System>

Figure 1:
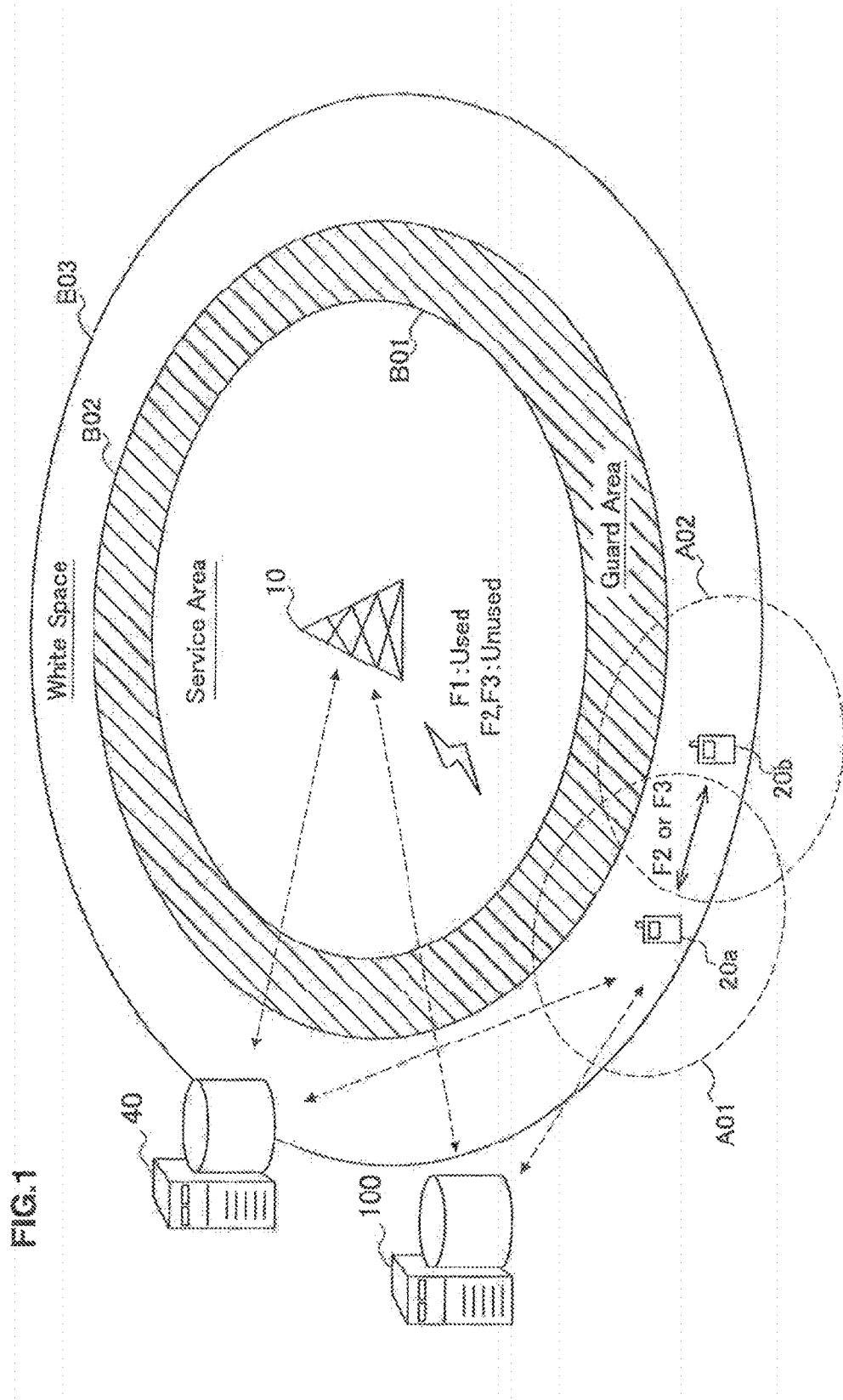
FIG. 1 is an explanatory diagram illustrating an outline of a communication system related to one embodiment.

FIG. 1 is an explanatory diagram illustrating an outline of a communication system related to one embodiment. Referring to FIG. 1, a primary usage node 10, secondary usage nodes 20a and 20b, a data server 40, and a communication control device 100 are shown.

The primary usage node 10 is a node that transmits/receives radio signals for a first communication service musing a frequency band which has been assigned in advance. However, the primary usage node 10 does not necessarily use the assigned whole frequency band. In the example of FIG. 1, a frequency band including channels F1, F2 and F3 has been assigned, but the primary usage node 10 is using only the channel F1 among them. The first communication service may be an arbitrary communication service including, for example, a digital TV broadcasting service, a satellite communication service, a mobile communication service, or the like. In addition, for example, when the first communication service is a mobile communication service, the primary usage node 10 can correspond to a base station.

A boundary 101 shown in FIG. 1 is an external boundary of a service area of the first communication service provided by the primary usage node 10. A terminal device (not shown) that is located within the boundary 101 can receive the first communication service provided by the primary usage node 10. A boundary 802 is an external boundary of a guide area set around the service area of the first communication service. The guide area is a buffer area set between the service area of the first communication service and a so-called white space. Since there is the guide area, even when a frequency band is secondarily used in the white space, a probability that a problem such as interference will occur in the terminal device located in the service area is reduced.

Between the boundary B02 and a boundary B03, the so-called white space is present. In the example of FIG. 1, the secondary usage nodes 20a and 20b are located in the white space. Each of the secondary usage nodes 20a and 20b is a communication device that provides a second communication service using a part of the frequency band assigned to the first communication service. In the following description of this specification, when there is no particular necessity to distinguish the secondary usage nodes 20a and 20b from each other, letters at the ends of the symbols are omitted, and the secondary usage nodes 20a and 20b will be generally referred to as secondary usage nodes 20.

A secondary usage node 20 determines whether or not secondary usage is available according to a predetermined spectrum policy, receives a channel provided by the data server 40, and then provides a second communication service to terminal devices (not shown) located around it. Without being limited to the example of FIG. 1, the secondary usage node 20 may be located in the service area of the first communication service or around the service area. For example, in order to cover a spectrum hole that is generated in the service area due to the influence of shadowing (shielding), fading, or the like, a secondary usage node may be installed in the service area of the first communication service.

The second communication service typically denotes an additional or substitutionary communication service that is provided using a part or the whole of a frequency band assigned to the first communication service. In the meaning of the term "secondary usage," the first communication service and the second communication service may be communication services of different types or services of the same type. Communication services of different types denote communication services of two or more different types that can be selected from arbitrary communication services, for example, a digital TV broadcasting service, a satellite communication service, a mobile communication service, a wireless LAN access service, a Peer-To-Peer (P2P) connection service, and the like. On the other hand, services of the same type can include a relationship between a service based on a macro-cell provided by a communication provider, for example, of a mobile communication service, and a service based on a femto-cell managed by a user or a Mobile Virtual Network Operator (MVNO). In addition, services of the same type can also include a relationship between a service provided by a base station of a communication service according to WiMAX, Long Term Evolution (LTE), LTE-Advanced (LTE-A), or the like and a service provided by a relay station (relay node) to cover a spectrum hole. Also, the second communication service may be a service that uses a plurality of fragmentary frequency bands aggregated using spectrum aggregation technology. Furthermore, the second communication service may be a supplementary communication service that is provided by a femto-cell group, a relay station group, or a small or medium-sized base station group, which provides a smaller service area than a base station, present within a service area of the base station. The outline of each embodiment described in this specification is widely applicable to every type of mode of such secondary usages.

The data server 40 has a database that receives node information including administrator information, location information, and the like from the secondary usage node 20 and accumulates the received node information. The data server 40 can be connected with the primary usage node 10 and the secondary usage node 20 via, for example, the Internet, a backbone network of the first communication service, or the like. The data server 40 accumulates the aforementioned node information received from the secondary usage node 20. Also, according to a request from the secondary usage node 20, the data server 40 provides information, for example, a channel that can be provided for secondary usage, maximum transmission power, a spectrum mask, and the like to the secondary usage node 20. In this way, the secondary usage node 20 becomes able to start the second communication service.

Figure 2:
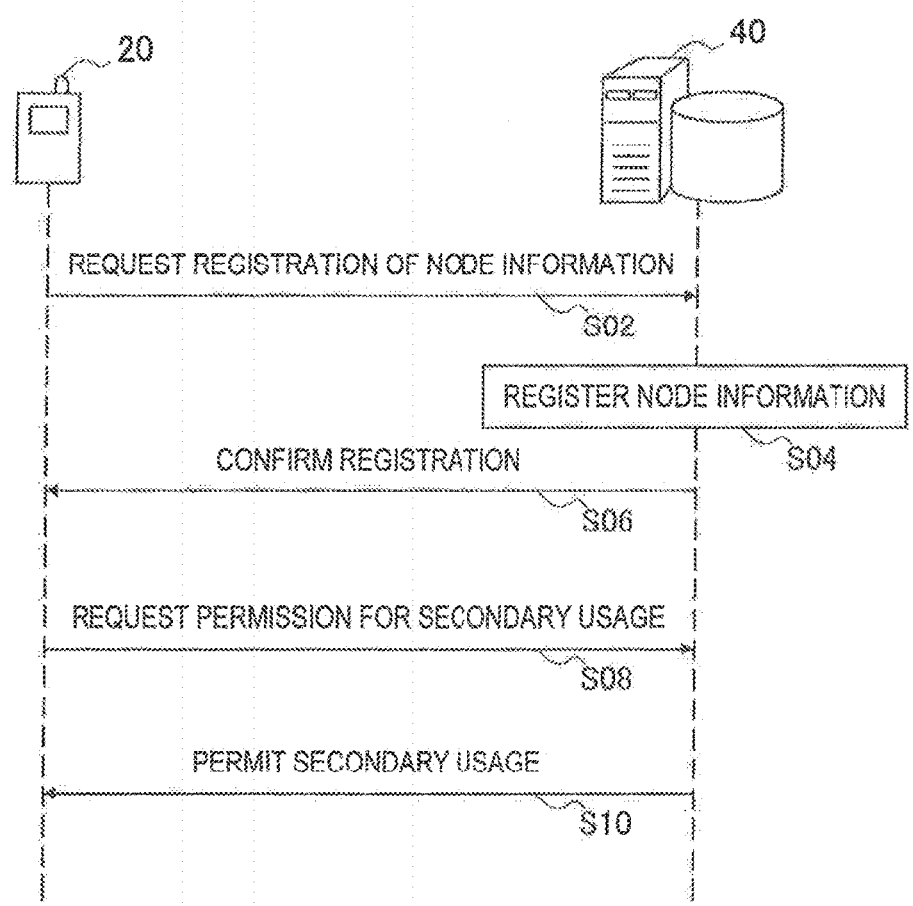
FIG. 2 is a sequence diagram showing an example of the flow of a process between a secondary usage node and a data server.

FIG. 2 is a sequence diagram showing an example of the flow of a process between the secondary usage node 20 and the data server 40 exemplified in FIG. 1. Referring to FIG. 2, the secondary usage node 20 that will secondarily use a frequency band assigned to the first communication service transmits node information to the data server 40 first, thereby requesting registration of the node information (step S02). Then, the data server 40 registers the node information received from the secondary usage node 20 in a database (step S04).

Here, the node information registered in the database includes, for example, the following information:

Regulation ID: an ID given when a node is authenticated as a device that can be used for secondary usage. The regulation ID can be included in node information in the case of secondary usage of a TV white space.

Manufacturer ID: an ID of a manufacturer of the device.

Location Data: indicates a location of the device that is dynamically measured using a positioning means such as GPS, or kept stationary.

Antenna Height: a height of an antenna of the device. For example, Height Above Average Terrain of the tx (HAAT) can be used.

Administrator Information: includes a device owner's name, address, mail address, and the like.

Next, the data server 40 transmits an acknowledgement signal (confirmation) confirming that registration of the node information has been finished to the secondary usage node 20 (stop S06). Next, the secondary usage node 20 requests permission for secondary usage from the data server 40 (step S08). Then, the data server 40 determines, for example, a channel that can be provided to the secondary usage node 20 (for example, an unused part of a frequency band assigned to the first communication service), and permits secondary usage to the secondary usage node 20 when there is a providable channel (step S10). Here, channels that can be provided to the secondary usage node 20 can be classified as restricted channels that are limited to a lower transmission power, which can be used by the secondary usage node 20, than a general transmission power, and normal channels that are not limited by such a limitation. When a normal channel can be provided, the data server 40 may preferentially provide the normal channel to the secondary usage node 20. For example, when an adjacent channel of a channel is not used by the first communication service in the case of a so-called Personal/Portable Mode-I client in an FCC standard, a maximum transmission power of 100 m[W] is permitted. Such a channel can be treated as a common channel. Meanwhile, when an adjacent channel of a channel is used by the first communication service, a maximum transmission power is limited to 40 m[W]. Such a channel can be treated as a restricted channel.

In step S10, the data server 40 provides the secondary usage node 20 with, for example, the following information:

Maximum Transmission Power: a maximum of transmission power at which the secondary usage node 20 is allowed to perform radiation.

Permissible Channel Information: a list of channel numbers specifying channels that can be provided to the secondary usage node 20. The frequency band assigned to the first communication service can be divided into a plurality of channels in advance, and channel numbers can be given to the respective channels. Instead of the channel numbers, center frequencies of the channels may be used. The permissible channel information can also include information indicating channel-specific channel categories (whether a channel is a normal channel or a restricted channel, and the like).

Regulatory Information: can include rules for secondary usage such as a spectrum mask.

In this specification, these pieces of information that are provided from the data server 40 to the secondary usage node 20 are referred to as grant information.

After these steps, the secondary usage node 20 can start secondary usage of the frequency band assigned to the first communication service.

The communication control device 100 is a communication device that controls communication of one or more secondary usage nodes 20. Like the data server 40, the communication control device 100 also can be connected with the primary usage node 10 and the secondary usage nodes 20 via, for example, the Internet, the backbone network of the first communication service, or the like. The communication control device 100 may be physically the same device as the database 40. As will be described in detail in the next chapter, the communication control device 100 adjusts a configuration of radio access techniques, channels, and the like of second communication services provided by the respective secondary usage nodes 20 between the plurality of second communication services using node information about the secondary usage nodes 20, information provided by the data server 40, and the like.

<2. Example of Configuration of Device Related to One Embodiment>

[2-1. Example of Configuration of Communication Control Device]

Figure 3:
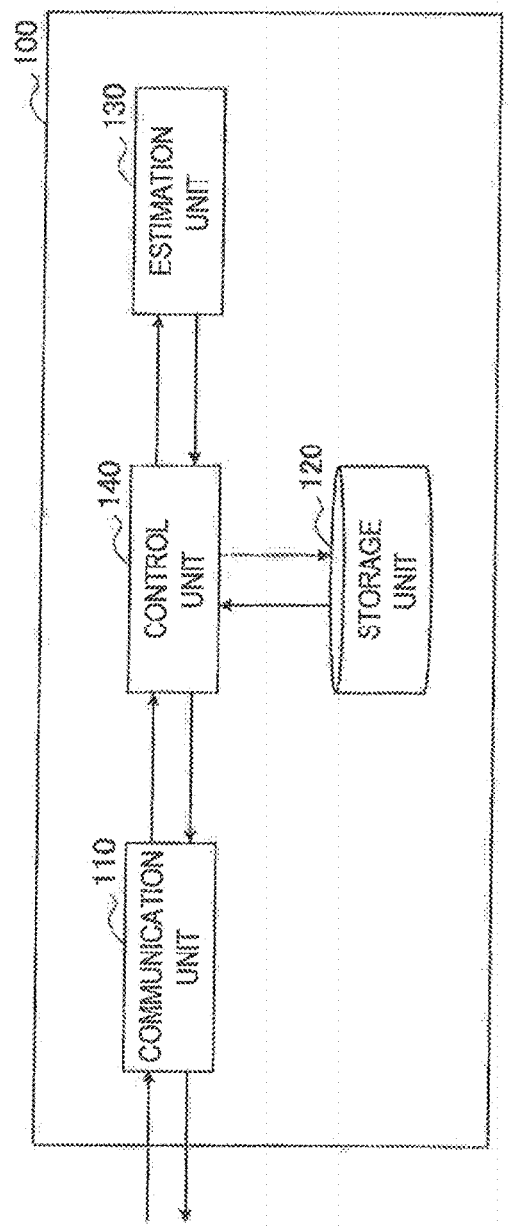
FIG. 3 is a block diagram showing an example of a configuration of a communication control device related to one embodiment.

FIG. 3 is a block diagram showing an example of a configuration of the communication control device 100 related to this embodiment Referring to FIG. 3, the communication control device 100 includes a communication unit 110, a storage unit 120, an estimation unit 130, and a control unit 140.

(Communication Unit)

The communication unit 110 is a communication interface for the communication control device 100 to communicate with the secondary usage nodes 20. In addition, the communication unit 110 may be able to communicate with the data server 40. In this embodiment, the communication unit 110 receives a request for registration of secondary usage from, for example, each secondary usage node 20 to which secondary usage is permitted.

The request for registration of secondary usage includes, for example, the following information:

Regulation ID: information that can be registered as node information in a data server.

Manufacturer ID: information that can be registered as node information in a data server.

Location Data: information that can be registered as node information in a data server.

Antenna Height: information that can be registered as node information in a data server.

Maximum Transmission Power: information that can be provided as grant information from a data server.

Permissible Channel Information: information that can be provided as grant information from a data server.

Regulatory Information: information that can be provided as grant information from a data server.

Utilization Channel Information: a number of a channel that a secondary usage node will use for a second communication service among channels included in a list of permissible channel information.

Access Technique Information: a list of access technique numbers indicating radio access techniques that can be used (and are currently in use) by a secondary usage node. The numbers can be given in advance according to each radio access technique such as IEEE802.11af, 11g or 11 n, IEEE802.22, IEEE802.16, LTE, LTE-A, or the like. Instead of a list of access technique numbers, the access technique information may include a bit string, a code value, or the like that indicates whether or not respective radio access techniques are supported. Also, the access technique information may include information indicating whether or not a protocol for coexistence of communication services, which will be described later, can be used.

In this embodiment, the communication control device 100 handles the location data, the antenna height, and the maximum transmission power among those pieces of information as service area information for estimating a service area of a second communication service provided by the secondary usage node 20. The information mentioned here is merely an example. In other words, the request for registration of secondary usage that is transmitted from the secondary usage node 20 to the communication control device 100 may not include a part of the aforementioned information, or may further include additional information. Also, the communication control device 100 may acquire a part of the aforementioned information not from the secondary usage node 20 but from the data server 40.

The communication unit 110 stores information received from each secondary usage node 20 in the storage unit 120. Also, the communication unit 110 receives an adjustment request from a secondary usage node 20 that requests an adjustment between second communication services. The adjustment request from the secondary usage node 20 is processed by the control unit 140 which will be described later.

(Storage Unit)

The storage unit 120 is implemented using a storage medium, for example, a hard disc, a semiconductor memory, or the like. In this embodiment, the storage unit 120 stores information included in the registration request that is received by the communication unit 110. Among the information stored in the storage unit 120, the service area information including the location data, the antenna height, and the maximum transmission power of the secondary usage node 20 can be used by the estimation unit 130, which will be described later, to estimate a service area. Also, the permissible channel information, the utilization channel information, and the access technique information can be used for an adjustment between second communication services by the control unit 140 which will be described later.

(Estimation Unit)

The estimation unit 130 estimates a service area of the second communication service provided by the secondary usage node 20 using the service area information stored by the storage unit 120, that is, the location data, the antenna height, and the maximum transmission power of the secondary usage node 20. For example, the estimation unit 130 approximates that the service area of the second service provided by the secondary usage node 20 is a circular area centered on the location of the secondary usage node 20.

As methods for estimating a radius of a service area, two methods are considered. A first method is a method that is disclosed in "Method for point-to-area predictions for terrestrial services in the frequency range 30 mhz to 3000 mhz" (International Telecommunications Commission (ITU), RECOMMENDATION ITU-R P1546-3, 2007) and uses a propagation path curve. In this case, a statistical curve (propagation path curve) that is based on an actual measurement value for deriving a communication distance (a distance at which communication is enabled with a predetermined location rate and a predetermined time rate) from an antenna height and electric field intensity is stored in advance by the storage unit 120. The estimation unit 130 converts the maximum transmission power of the secondary usage node 20 into electric field intensity, and acquires a communication distance corresponding to the antenna height and electric field intensity of the secondary usage node 20 from the propagation path curve stored in the storage unit 120. This communication distance becomes a radius of the service area of the second communication service provided by the secondary usage node 20.

A second method for estimating a radius of a service area is a method employing an evaluation formula in the urban model of Okumura-Hata curve (see "Digital Wireless Transmission Technology" (written by Seiichi Sampei, Pearson Education Japan, pp. 16-19)). In this case, the estimation unit 130 calculates a maximum allowable path loss from the maximum transmission power of the secondary usage node 20 and a minimum reception sensitivity of a receiver. Then, the estimation unit 130 substitutes the calculated path loss and the antenna height in the evaluation formula, thereby calculating a communication distance. This communication distance becomes a radius of the service area of the second communication service provided by the secondary usage node 20.

The estimation unit 130 causes the storage unit 120 to store a value that is estimated in this way and indicates a service area of a second communication service of each secondary usage node 20 (for example, a center position and a radius of a circle).

(Control Unit)

The control unit 140 adjusts a configuration for secondary usage between second communication services on the basis of a location relationship between service areas estimated by the estimation unit 130 and a radio access technique that can be used by the secondary usage nodes 20. The adjustment of a configuration for secondary usage between second communication services includes a recommendation about a radio access technique or a recommendation about a channel to be used for at least one secondary usage node 20 in terms of, for example, increase in secondary usage opportunities, improvement in frequency use efficiency, or the like. In other words, the control unit 140 determines a radio access technique or a channel that is recommended to at least one secondary usage node 20 on the basis of a location relationship between service areas estimated by the estimation unit 130 and a radio access technique that can be used by the secondary usage nodes 20. Then, the control unit 140 notifies the secondary usage nodes 20 of the determined radio access technique or channel through the communication unit 110. According to the notification, the secondary usage node 20 performs secondary usage using the recommended new radio access technique or channel.

[2-2. Example of Location Relationship Between Service Areas]

Figure 4:
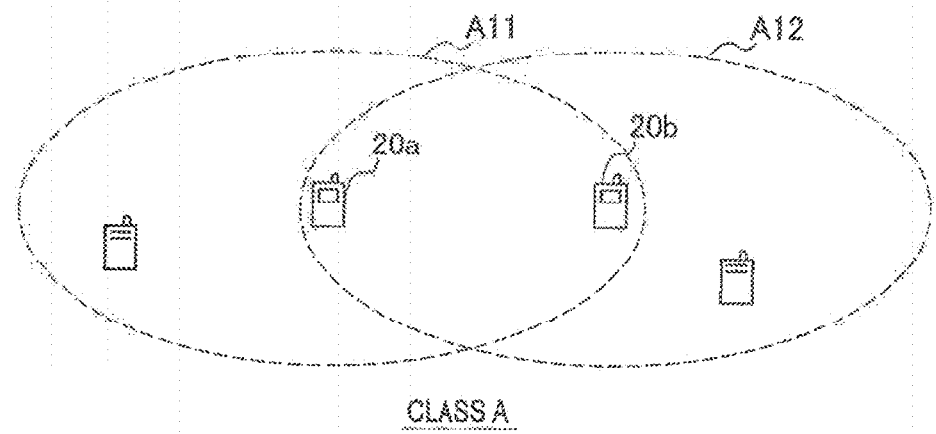
FIG. 4 is an explanatory diagram illustrating a first example of a location relationship between a second communication service and a service area.
Figure 5:
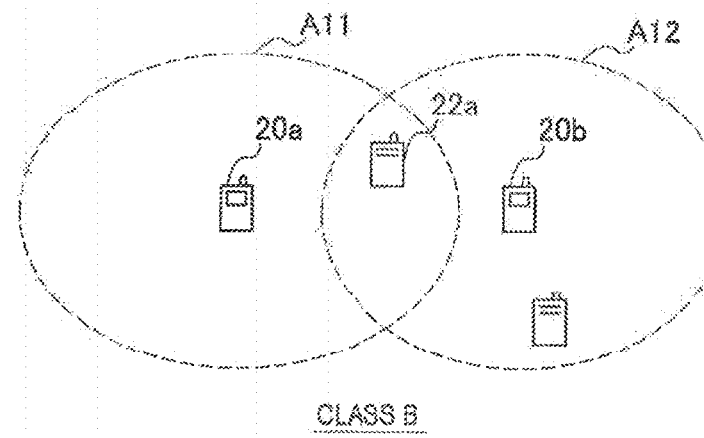
FIG. 5 is an explanatory diagram illustrating a second example of a location relationship between a second communication service and a service area.

Location relationships between service areas based on which the control unit 140 makes an adjustment between second communication services are classified into, for example, three classes (referred to as class A, class B, and class C) exemplified in FIG. 4 to FIG. 6.

(Class A)

Referring to FIG. 4, an example of a location relationship between service areas that belongs to class A is shown. In FIG. 4, a service area A11 of the secondary usage node 20*a* and a service area A12 of the secondary usage node 20*b* overlap. In addition, the secondary usage node 20*b* is included in the service area A11 of the secondary usage node 20*a*. Likewise, the secondary usage node 20*a* is included in the service area A12 of the secondary usage node 20*b*. In such a location relationship, radio waves transmitted by these adjacent secondary usage nodes 20*a* and 20*b* become mutual interference factors, and there is a probability that a problem will occur in secondary usage. In addition, a case in which only one of the two secondary usage nodes 20 is included in a service area of the other may be included in class A.

For example, when service areas of two second communication services have the location relationship of class A, the control unit 140 further determines whether or not there is a common radio access technique that can be used by the two secondary usage nodes 20*a* and 20*b* which provide the two second communication services respectively. For example, when the secondary usage nixie 20*a* can use radio access techniques R1 and R2, and the secondary usage node 20*b* can use the radio access technique R1, the radio access technique R1 is determined as a common radio access technique. When there is a common radio access technique as mentioned above, the control unit 140 recommends that the secondary usage nodes 20*a* and 20*b* use the common radio access technique and a common channel. In this way, for example, the communication services are caused to coexist, or a mesh network is formed between the secondary usage nodes 20*a* and 20*b*, so that the second communication services can be managed without interfering with each other. For example, 11s in the IEEE802.22, Ecma392, and IEEE802.11 families, 16j in the IEEE802.16 (WiMax) family, and the like support a mesh protocol or a protocol for exchanging scheduling information. Accordingly, communication services can coexist between communication services that employ these radio access techniques. There is a case in which the IEEE802.11 family supports a function for acquiring resource usage information about an adjacent network through an access point or a terminal in a method such as beacon request using a public action frame, and the like. In this case also, communication services can coexist in the same way. Even if usable radio access techniques are different (not the same), when a combination of the radio access techniques is a combination of which the radio access techniques can coexist, the control unit 140 can cause two communication services to coexist in a common channel. This is the same for the other classes that will be described below. When usable radio access techniques are different from each other and are not able to coexist, the control unit 140 recommends that the secondary usage node 20a or 20b, which provides one second communication service, use a second channel that is different from a first channel used by the other second communication service. At this time, it is more preferable that the second channel not be adjacent to the first channel on the frequency axis because interference by out-of-band radiation is also prevented. In this way, it is possible to separately manage the second communication service of the secondary usage node 20a and the second communication service of the secondary usage node 20b without them interfering with each other.

(Class B)

Referring to FIG. 5, an example of a location relationship between service areas that belongs to class B is shown. In FIG. 5, the service area A11 of the secondary usage node 20a and the service area A12 of the secondary usage node 20b overlap. However, the secondary usage node 20b is not included in the service area A11 of the secondary usage node 20a, and the secondary usage node 20a is not included in the service area A12 of the secondary usage node 20b. In such a location relationship, radio waves interfere with a terminal device 22a located in the overlapping area, and there is a probability that a partial problem will occur in secondary usage.

For example, when service areas of two second communication services have the location relationship of class B, the control unit 140 further determines whether or not there is a common radio access technique that can be used by the two secondary usage nodes 20a and 20b which provide the two second communication services respectively. When there is a common usable radio access technique, the control unit 140 recommends that the secondary usage nodes 20a and 20b use the common radio access technique and a common channel. In this way, like in the case of class A, it is possible to manage the second communication services without them interfering with each other. However, in the case of class B, the secondary usage nodes 20a and 20b are not able to directly receive signals transmitted by the counterparts. For this reason, in this case, the control unit 140 causes the communication unit 110 to transmit a synchronization signal to the two secondary usage nodes 20a and 20b, thereby supporting coexistence of the communication services or formation of a mesh network. Like in the case of class A, when usable radio access techniques are different and are not able to coexist, the control unit 140 recommends that the secondary usage node 20a or 20b, which provides one second communication service, use a channel (suitably, non-adjacent channel) that is different from a channel used by the other second communication service (Class C)

Referring to FIG. 6, an example of a location relationship between service areas that belongs to class C is shown. In FIG. 6, the service area A11 of the secondary usage node 20a and the service area A12 of the secondary usage node 20b do not overlap. In such a location relationship, the control unit 140 recommends, for example, that the two secondary usage nodes 20a and 20b, which provide two second communication services respectively, use a common channel irrespective of usable radio access techniques. In this way, it is possible to increase a selection of channels for a secondary usage node 20 that provides another second communication service (not shown). However, in class C also, when mutual interference between nodes of two second communication services (for example, interference between nodes located in external boundary portions of two service areas) exceeds an allowable level, the control unit 140 may perform control for sharing communication resources, like in class A and class B described above.

In addition, the control unit 140 selects, for example, a channel to be recommended to each secondary usage node 20 from among channels indicated by permissible channel information received from the secondary usage node 20. This means that an adjustment between second communication services by the communication control device 100 can be performed within the range of regulation for secondary usage (legal regulation of each country, regulation determined between service providers, or the like). Accordingly, even when the secondary usage node 20 receives a notification from the communication control device 100 and changes a channel, there is no risk of interfering with the first communication service or other communication services that can be managed around the secondary usage node 20.

[2-3. Example of Configuration of Secondary Usage Node]

FIG. 7 is a block diagram showing an example of a configuration of the secondary usage node 20 related to this embodiment. The secondary usage node 20 may be a communication device that provides an arbitrary second communication service, for example, a small or medium-sized base station, a wireless relay station, a radio access point, or the like. Thus, there is a probability that the secondary usage node 20 will have a variety of components according to its role. However, in FIG. 7, only components that are directly related to this embodiment are shown. Referring to FIG. 7, the secondary usage node 20 includes a first communication unit 210, a second communication unit 220, a storage unit 230, and a secondary usage control unit 240.

(First Communication Unit)

The first communication unit 210 is a communication interface for the secondary usage node 20 to communicate with the data server 40 and the communication control device 100. For example, according to control of the secondary usage control unit 240, the first communication unit 210 transmits a request for registration of the node information, which has been described with reference to FIG. 2, to the data server 40 and receives a registration acknowledgement of the node information. Also, for example, according to control of the secondary usage control unit 240, the first communication unit 210 transmits a request for secondary usage permission to the data server 40 and receives grant information including a response from the data server 40. Further, the first communication unit 210 transmits a request for an adjustment between second communication services, which will be described in detail later, to the communication control device 100, and receives information about a recommended service configuration that is transmitted as a result of the adjustment from the communication control device 100.

(Second Communication Unit)

The second communication unit 220 is a communication interface for the secondary usage node 20 to provide a second communication service to terminal devices around it. A radio access technique supported by the second communication unit 220 may be an arbitrary method such as IEEE802.11 at 11g or 11n, IEEE802.22, LTE, LTE-A, or the like. Access technique information that indicates the radio access technique supported by the second communication unit 220 is stored in advance in the storage unit 230.

(Storage Unit)

The storage unit 230 is implemented using a storage medium, for example, a hard disc, a semiconductor memory, or the like. In this embodiment, the storage unit 230 stores in advance the aforementioned node information that the secondary usage node 20 registers in the data server 40. Also, the storage unit 230 stores the aforementioned access technique information in advance. When the aforementioned grant information is provided from the data server 40, the storage unit 230 stores the grant information. Further, the secondary usage node 20 stores, as utilization channel information, a number of a channel that the secondary usage control unit 240 will use for the second communication service.

(Secondary Usage Control Unit)

The secondary usage control unit 240 controls a series of processes for secondary usage of a frequency band by the secondary usage node 20. For example, the secondary usage control unit 240 performs a process with the data server 40 exemplified in FIG. 2 through the first communication unit 210. Also, the secondary usage control unit 240 determines the necessity for an adjustment between second communication services, and transmits an adjustment request to the communication control device 100 when the adjustment is necessary. The case in which the adjustment between second communication services is necessary can include, for example, a case in which secondary usage is started according to permission from the data server 40, but it is not possible to obtain communication quality as expected due to interference between the second communication services. The case in which the adjustment between second communication services is necessary can also include, for example, a case in which it is preferable to expand a service area in order to cause a non-connected terminal device to participate in a second communication service. The case in which the adjustment between second communication services is necessary can further include, for example, a case in which it is preferable to extend a band by adding a channel. An example of a process after the secondary usage control unit 240 transmits the adjustment request will be described in detail in the next chapter. Without receiving the adjustment request from the secondary usage node 20, the communication control device 100 may voluntarily make the adjustment between the second communication services in order to improve efficiency in frequency usage.

<3. Flow of Process Related to One Embodiment>

Next, with reference to FIG. 5 to FIG. 10C, description will be made regarding the flow of a communication control process between the communication control device 100 and the plurality of secondary usage nodes 20 related to this embodiment.

[3-1. Communication Control Process]

FIG. 8 is a sequence diagram showing an example of the flow of a communication control process between the communication control device 100 and the secondary usage nodes 20a and 20b related to this embodiment. It is assumed that node information has been registered in the data server 40 by the secondary usage nodes 20a and 20b before the process of FIG. 8, and permission for secondary usage has already been given to the secondary usage nodes 20a and 20b.

Referring to FIG. 8, first, the secondary usage node 20b requests the communication control device 100 to register secondary usage (step S102). As mentioned above, a registration request transmitted from the secondary usage node 20b includes service area information for estimating a service area of a second communication service provided by the secondary usage node 20b, access technique information, and the like. Then, the communication control device 100 stores the information received from the secondary usage node 20b in the storage unit 120 (step S104). The communication control device 100 transmits an acknowledgement signal (confirmation) confirming that the registration has been finished to the secondary usage node 20b (step S106).

The secondary usage node 20a requests registration of secondary usage from the communication control device 100 (step S108). The registration request transmitted from the secondary usage node 20a likewise includes service area information, access technique information, and the like. Then, the communication control device 100 stores the information received from the secondary usage node 20a in the storage unit 120 (step S110). The communication control device 100 transmits an acknowledgement signal (confirmation) confirming that the registration has been finished to the secondary usage node 20a (step S112).

Subsequently, the estimation unit 130 of the communication control device 100 estimates service areas of respective second communication services using the service area information that has been received from the respective secondary usage nodes 20a and 20b (step S114). Here, the service area estimation process by the estimation unit 130 may be performed after there is a request for an adjustment between the second communication services in step S116.

Next, when the necessity for an adjustment between the second communication services is recognized, the secondary usage node 20a requests the adjustment between the second communication services from the communication control device 100 (step S116). Here, the secondary usage node may not request the adjustment between the second communication services from the communication control device 100, but rather, the communication control device 100 may voluntarily start the adjustment between the second communication services. Subsequently, the communication control device 100 determines a configuration of the second communication services to be recommended to the secondary usage node 20a or another secondary usage node 20 (step S118). In the example of FIG. 8, the other secondary usage node 20 corresponds to the secondary usage node 20b. The communication control device 100 notifies at least one of the secondary usage node 20a and the secondary usage node 20b of the recommended service configuration (that is, a radio access technique to be used, a channel to be used, or the like) (step S120).

[3-2. Service Area Determination Process]

FIG. 9 is a flowchart showing an example of the flow of a service area estimation process by the communication control device 100 in step S114 of FIG. 8.

Referring to FIG. 9, first, the estimation unit 130 of the communication control device 100 acquires a location, a maximum transmission power, and an antenna height of the secondary usage node 20 stored in the storage unit 120 (step S132). Next, the estimation unit 130 calculates a radius of a service area of a second communication service using the maximum transmission power and the antenna height of the secondary usage node 20 (step S134). The estimation unit 130 estimates that a circular area which has the radius calculated in step S134 centered on the location of the secondary usage node 20 is the service area of the second communication service provided by the secondary usage node 20 (step S136). When it is possible to acquire additional information, for example, data about the antenna directivity of the secondary usage node 20, data of the surrounding terrain, or the like, the estimation unit 130 may estimate a service area in an oval shape or a more complex shape according to terrain, rather than a circular shape.

[3-3. Process of Determining Recommended Service Configuration]

FIG. 10A to FIG. 10C are flowcharts showing an example of the flow of a process of determining a recommended service configuration by the communication control device 100 in step S118 of FIG. 8.

Referring to FIG. 10A, first, the control unit 140 of the communication control device 100 determines whether or not the service areas of the two second communication services provided by the secondary usage nodes 20a and 20b overlap (step S151). Whether or not the service areas overlap may be determined on the basis of, for example, whether or not the sum of radii of the two service areas is less than the distance between the secondary usage nodes 20a and 20t. Here, when it is determined that the service areas do not overlap, the process proceeds to step S170 of FIG. 10C. On the other hand, when it is determined that the service areas overlap, the process proceeds to step S152.

When the process proceeds to step S152, a location relationship between the service areas of the two second communication services belongs to any one of class A and class B shown in FIG. 4 and FIG. 5. In this case, the control unit 140 determines whether or not there is a common radio access technique that can be used by the two secondary usage nodes 20a and 20b (step S152). Here, when it is determined that there is no common usable radio access technique, the process proceeds to step S161 of FIG. 10B. On the other hand, when it is determined that there is a common usable radio access technique, the process proceeds to step S153.

In step S153, the control unit 140 determines whether or not a trigger for the ongoing process of determining a recommended service configuration is a secondary usage node (step S153). For example, when the communication control device 100 has received a request for an adjustment between second communication services from the secondary usage node 20a and thus the process of determining a recommended service configuration has been started, it is determined that the trigger for the process of determining a recommended service configuration is a secondary usage node. In this case, the process proceeds to step S161 of FIG. 10B. On the other hand, when the communication control device 100 has actively started the process of determining a recommended service configuration, the trigger for the process is not a secondary usage node, and thus the process proceeds to step S154.

In step S154, the control unit 140 determines whether or not radio access techniques that are currently being used by the two secondary usage nodes 20a and 20b are the same (step S154). Here, when it is determined that the radio access techniques that are currently being used are the same, the process proceeds to step S161 of FIG. 10B. On the other hand, when it is determined that the radio access techniques that are currently being used are not the same, the process proceeds to step S155.

In step S155, the control unit 140 determines whether or not the common radio access techniques that are currently being used by the two secondary usage nodes 20a and 20b operate validly (that is, in parallel without causing a problem) (step S155). For example, when radio access techniques in which it is difficult to manage two systems in parallel are used in the situation in which the service areas overlap, the control unit 140 can determine that the common radio access techniques do not validly operate. In this case, the process proceeds to step S173 of FIG. 10C. On the other hand, when it is determined that the common radio access techniques validly operate, the process proceeds to step S156.

When the process proceeds to step S156, the control unit 140 recommends that the two secondary usage nodes 20a and 20b use the common usable radio access techniques and a common channel (step S156). Here, when there are a normal channel whose transmission power has no limitation and a restricted channel whose transmission power has a limitation as recommendable channels, the control unit 140 may preferentially recommend use of the normal channel. Also, the control unit 140 determines whether or not it is necessary to supply a synchronization signal to the two secondary usage nodes 20a and 20b (step S157). For example, when one secondary usage node 20 is not included in a service area of the other secondary usage node 20, the location relationship between the service areas of the two second communication services corresponds to class B. In this case, when it is not possible to use a mesh protocol stack, for example, Ecma392 and the like, it is necessary to assist with synchronization between the communication services. In the case of class A and the like also, when clock deviation is large like in the IEEE802.11 family, it is preferable to assist with synchronization between the communication services. In such a situation, the control unit 140 can determine that it is necessary to supply a synchronization signal to the two secondary usage nodes 20a and 20b.

When it is determined in step S157 that it is necessary to supply a synchronization signal, the control unit 140 supplies a synchronization signal to the two secondary usage nodes 20a and 20b through the communication unit 110 (step S158). On the other hand, when it is determined in step S157 that it is unnecessary to supply a synchronization signal, the communication control device 100 does not supply a synchronization signal to these nodes.

In step S161 of FIG. 10B, the control unit 140 determines whether or not there is a combination of radio access techniques that can be used by the two secondary usage nodes 20a and 20b and can also coexist with each other on a common channel in an overlapping service area (step S161). For example, in a frame format of the standard specification of IFEE802.22, a "Coexistence Beacon Period" for exchanging information between a plurality of communication services is installed. The secondary usage nodes 20a and 20b form a mesh network by exchanging scheduling information, path information, or the like using, for example, the "Coexistence Beacon Period," or exchange control information so that timings of scheduling do not overlap, and thereby can cause the two communication services to coexist. When it is determined that there is a combination of radio access techniques that can coexist, the control unit 140 recommends use of the radio access techniques and a common channel (step S162). On the other hand, when there is no combination of radio access techniques that can coexist, the process proceeds to step S163.

In step S163, the control unit 140 determines whether or not it is possible to assign different channels to the two second communication services (step S163). Here, when it is possible to assign different channels to the two second communication services, the control unit 140 recommends that the secondary usage nodes 20a and 20b use the different channels (step S164). For example, when permissible channel information from the secondary usage nodes 20a and 20b include the channels F1 and F2 in common, the channel F1 can be recommended to the secondary usage node 20a, and the channel F2 can be recommended to the secondary usage node 20b. On the other hand, when it is not possible to assign different channels to the two second communication services, the process proceeds to step S165.

In step S165, the control unit 140 determines whether or not sharing of communication resources becomes possible by supporting sharing of the communication resources of the two second communication services (step S165). For example, when it is possible to cause the two communication services to coexist in a time division method by supplying a synchronization signal to the secondary usage nodes 20a and 20b, it can be determined that sharing of the communication resources is possible. In this case, the process proceeds to step S167. On the other hand, when it is determined that sharing of the communication resources is not possible, the process proceeds to step S166. In step S166, since no recommendable combination is found, the control unit 140 notifies the secondary usage node 20a that no recommendable combination is found.

When the process proceeds to step S167, the location relationship between the service areas of the two secondary communication services belongs to class A or class B. Also, the communication resources can be shared. Such a combination of radio access techniques includes, for example, a combination of OFDMA and CSMA. In this case, the control unit 140 recommends use of different radio access techniques and a common channel (step S167). Subsequently, the control unit 140 causes exchange of information that specifies a range of the sharable communication resources between the secondary usage nodes 20a and 20b, and supplies a synchronization signal to the secondary usage nodes 20a and 20b, thereby causing the two communication services that employ the different radio access techniques to coexist.

When the process proceeds to step S170 of FIG. 10, the location relationship between the service areas of the two secondary communication services belongs to class C shown in FIG. 6. In this case, the control unit 140 determines whether or not a trigger for the ongoing process of determining a recommended service configuration is a secondary usage node (step S170). Here, when the trigger for the process of determining a recommended service configuration is a secondary usage node, the process proceeds to step S172. On the other hand, when the trigger for the process of determining a recommended service configuration is not a secondary usage node, the process proceeds to step S171. In step S171, the control unit 140 determines whether or not mutual interference between the nodes of the two second communication services is an allowable level or less (stop S171). For example, the control unit 140 estimates an interference level between the two second communication services on the basis of transmission powers of the respective second communication services and path loss according to the distance between the nodes. At this time, a margin for absorbing an estimation error may be included in the estimation result of the interference level. Also, the control unit 140 compares the estimated interference level with the allowable interference level according to necessary communication quality (a minimum SINR and the like) of each secondary communication service. On the basis of the results, the control unit 140 can determine whether or not mutual interference between the nodes is the allowable level. Alternatively, a node of a second communication service may measure an actual interference level, and the communication control device 100 may receive the measurement result for comparison with the allowable interference level. Also, a node of a second communication service may report a result of comparison between an actual interference level and the allowable interference level to the communication control device 100. Here, when the mutual interference between the nodes of the two second communication services does not exceed the allowable level, the process proceeds to step S172. In step S172, the control unit 140 recommends that the secondary usage nodes 20a and 20b use a common channel irrespective of radio access techniques. On the other hand, when the mutual interference between the nodes of the two second communication services exceeds the allowable level, the process proceeds to step S173.

In step S173, the control unit 140 determines whether or not it is possible to assign different channels to the two second communication services (step S173). Here, when it is possible to assign different channels to the two second communication services, the control unit 140 recommends that the secondary usage nodes 20a and 20b use the different channels (step S174). On the other hand, when it is not possible to assign different channels to the two second communication services, the process proceeds to step S175

In step S175, the control unit 140 determines whether or not sharing of communication resources becomes possible by supporting sharing of the communication resources of the two second communication services (step S175). Here, when it is determined that sharing of the communication resources is possible, the process proceeds to step S177. On the other hand, when it is determined that sharing of the communication resources is not possible, the process proceeds to step S176. In step S176, since no recommendable combination is found, the control unit 140 notifies the secondary usage node 20a that no recommendable combination is found.

In step S177, the control unit 140 recommends use of different radio access techniques and a common channel (step S177). Subsequently, the control unit 140 causes exchange of information that specifies a range of the shamble communication resources between the secondary usage nodes 20a and 20b, and supplies a synchronization signal to the secondary usage nodes 20a and 20b, thereby causing the two communication services to coexist by, for example, the time division method.

The flow of the process of determining a recommended service configuration by the communication control device 100 is not limited to the example shown in FIG. 10A to FIG. 10C. In other words, some process steps shown in FIG. 10A to FIG. 10C may be omitted or integrated, or an additional step may be added. Also), the sequence of process steps may be changed. Here, an example in which the communication control device 100 adjusts a service configuration between two communication services has been mainly described. However, this embodiment can also be applied to the case of an adjustment among three or more communication services in the same way.

When there are a normal channel and a restricted channel as recommendable channels in steps S156, S162, S164, S167, S172, S174, S177, and the like shown in FIG. 10A to FIG. 10C, the normal channel can be preferentially recommended. According to such a configuration, it is possible to keep throughput of each second communication service high while increasing efficiency in frequency usage by an adjustment between second communication services.

<4. Typical Scenarios for Communication Control>

The above-described adjustment between second communication services by the communication control device 100 is useful for a variety of scenarios. By way of example, five scenarios will be described below.

[4-1. First Scenario]

Figure 11A:
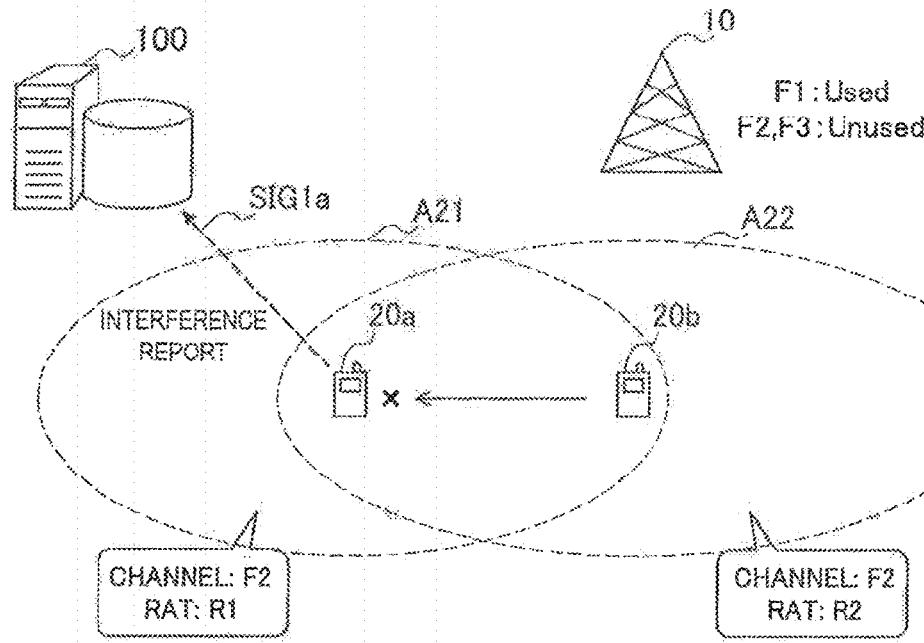
FIG. 11A is a first explanatory diagram illustrating a first scenario of a communication control process related to one embodiment.
Figure 11B:
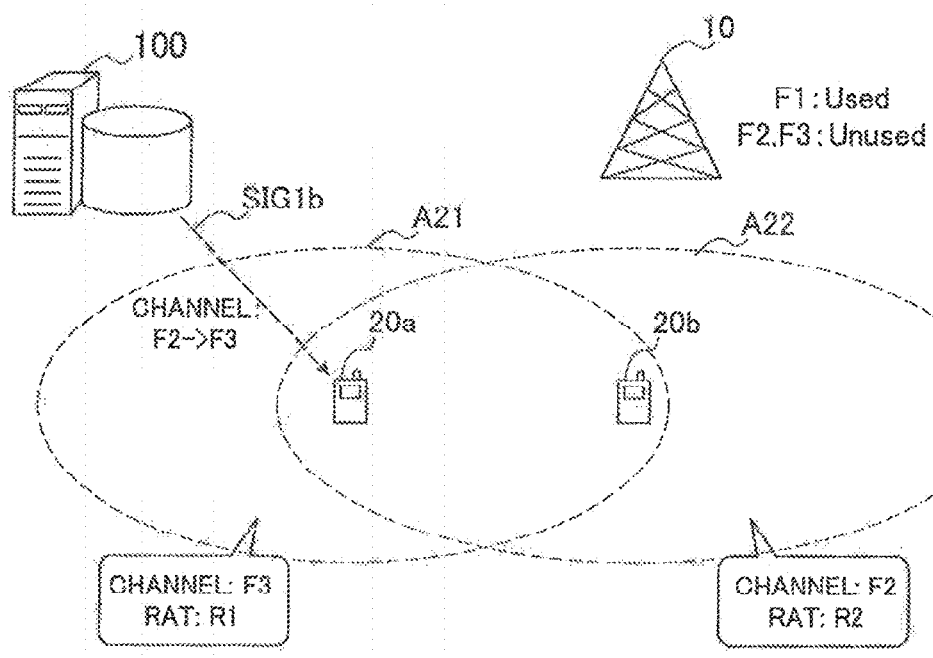
FIG. 11B is a second explanatory diagram illustrating the first scenario of the communication control process related to one embodiment.

FIG. 1A and FIG. 11B are explanatory diagrams illustrating a first scenario of a communication control process. Referring to FIG. 11A, the primary usage node 10, the secondary usage nodes 20*a* and 20*b*, and the communication control device 100 are shown.

A frequency band including the channels F1, F2 and F3 is assigned to a first communication service provided by the primary usage node 10. Among these channels, the primary usage node 10 is using the channel F1. On the other hand, the channels F2 and F3 are not being used.

The secondary usage node 20*a* receives permission from a data server, which is not shown, and provides a second communication service on the channel F2 using the radio access technique R1. Also, the secondary usage node 20*b* receives permission from the data server, which is not shown, and provides a second communication service on the channel F2 using the radio access technique (RAT) R2. However, in this case, the distance between the secondary usage nodes 20*a* and 20*b* is short, and thus a signal transmitted from, for example, the secondary usage node 20*b* causes interference with the secondary usage node 20*a*. The secondary usage node 20*a* detects such interference, and reports that interference has occurred to the communication control device 100 (SIG1*a*). This report denotes a request for an adjustment between the second communication services.

In this case, according to the process of determining a recommended service configuration exemplified in FIG. 10A to FIG. 10C, the communication control device 100 recommends a change in the channel that is being used by, for example, the secondary usage node 20*a* from F2 to F3 (SIG1*b*). In this way, the secondary usage node 20*a* can change the channel for secondary usage with F3 to avoid interference and favorably continue secondary usage.

[4-2. Second Scenario]

Figure 12A:
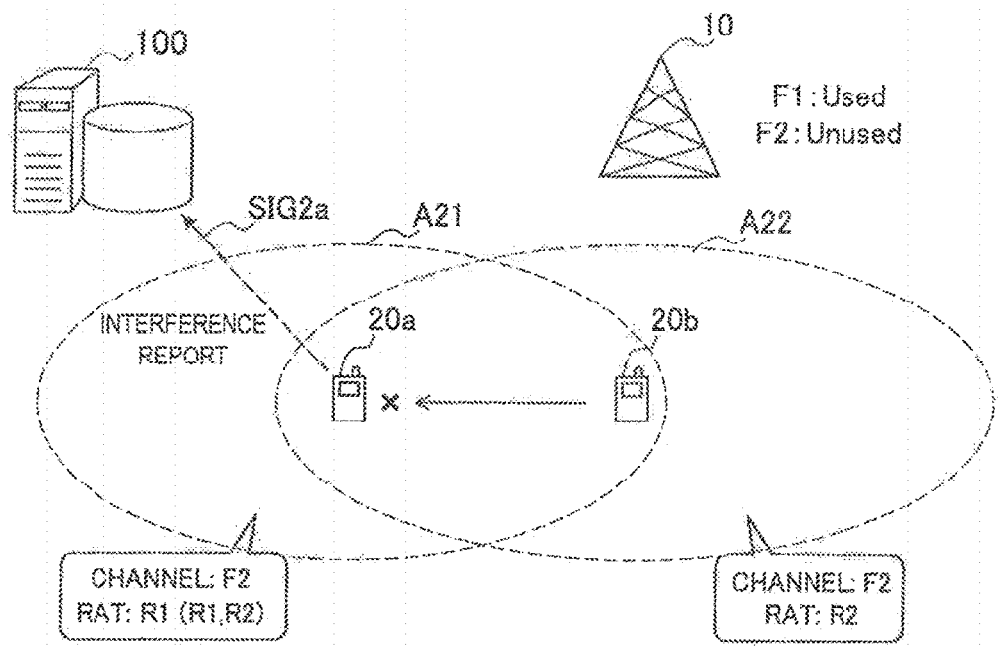
FIG. 12A is a first explanatory diagram illustrating a second scenario of the communication control process related to one embodiment.
Figure 12B:
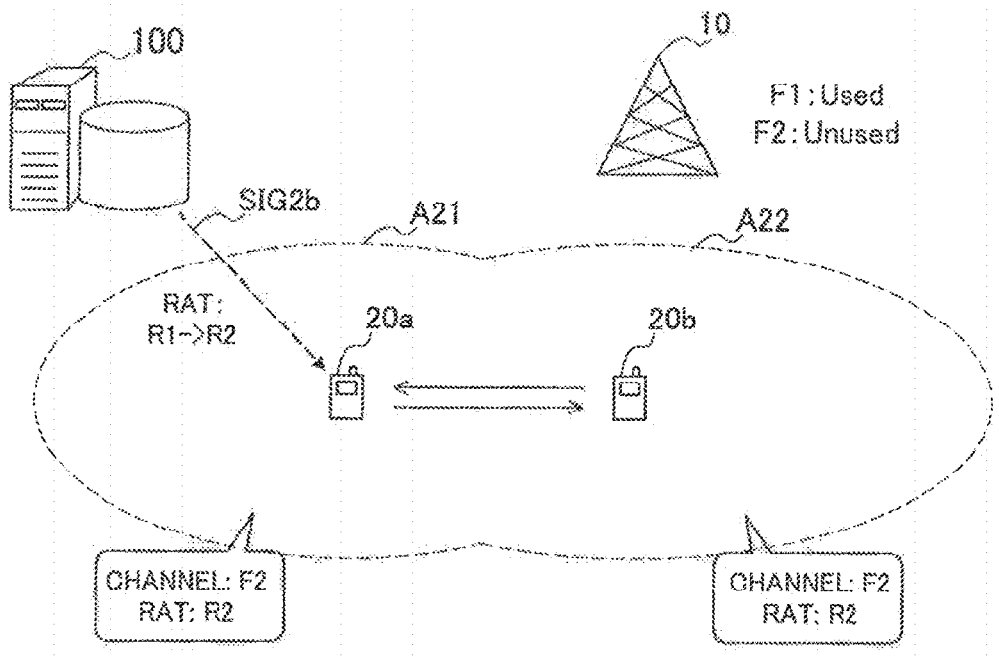
FIG. 12B is a second explanatory diagram illustrating the second scenario of the communication control process related to one embodiment.

FIG. 12A and FIG. 12B are explanatory diagrams illustrating a second scenario of the communication control process. Referring to FIG. 12A, the primary usage node 10, the secondary usage nodes 20*a* and 20*b*, and the communication control device 100 are shown again.

Like in the first scenario, even in this scenario, a frequency band including the channels F1, F2 and F3 is assigned to a first communication service provided by the primary usage node 10. Among these channels, the primary usage node 10 is using the channel F1. On the other hand, particularly, the channel F2 is not being used.

The secondary usage node 20*a* receives permission from a data server, which is not shown, and provides a second communication service on the channel F2 using the radio access technique R1. However, the secondary usage node 20*a* can use the radio access technique R2 in addition to the radio access technique R1. Also, the secondary usage node 20*b* receives permission from the data server, which is not shown, and provides a second communication service on the channel F2 using the radio access technique R2. However, in this case, the distance between the secondary usage nodes 20*a* and 20*b* is short, and thus a signal transmitted from, for example, the secondary usage node 20*b* causes interference with the secondary usage node 20*a*. The secondary usage node 20*a* detects such interference, and reports that interference has occurred to the communication control device 100 (SIG2*a*).

In this case, according to the process of determining a recommended service configuration exemplified in FIG. 10A to FIG. 10C, the communication control device 100 recommends, for example, that the secondary usage node 20*a* switch the radio access technique from R1 to R2 (SIG2*b*). In this way, the secondary usage node 20*a* can form a mesh network using the same radio access technique R2 and the same channel F2 as the secondary usage node 20*b* to avoid interference and favorably continue secondary usage.

[4-3. Third Scenario]

Figure 13A:
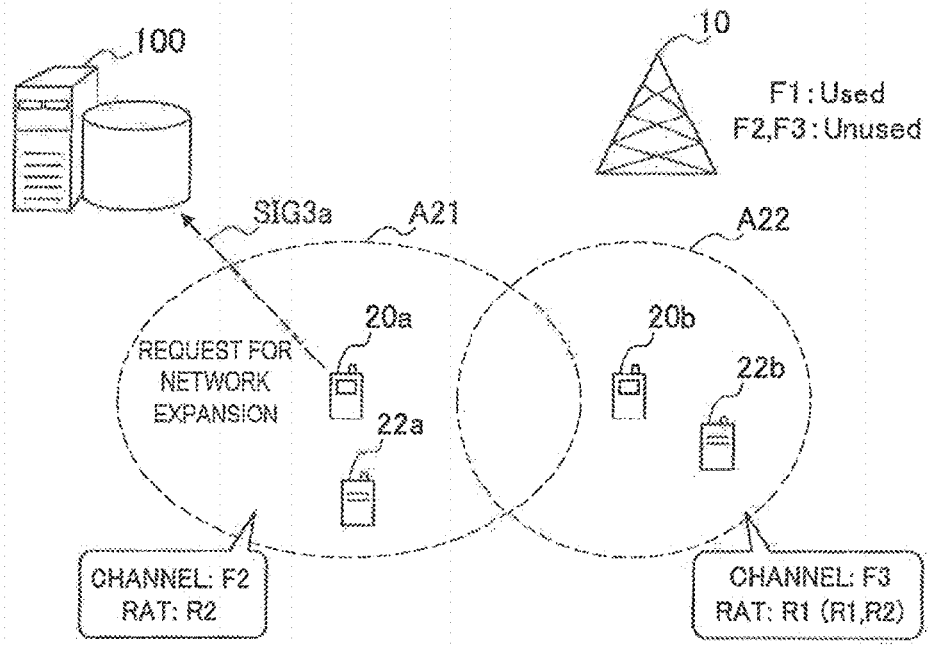
FIG. 13A is a first explanatory diagram illustrating a third scenario of the communication control process related to one embodiment.
Figure 13B:
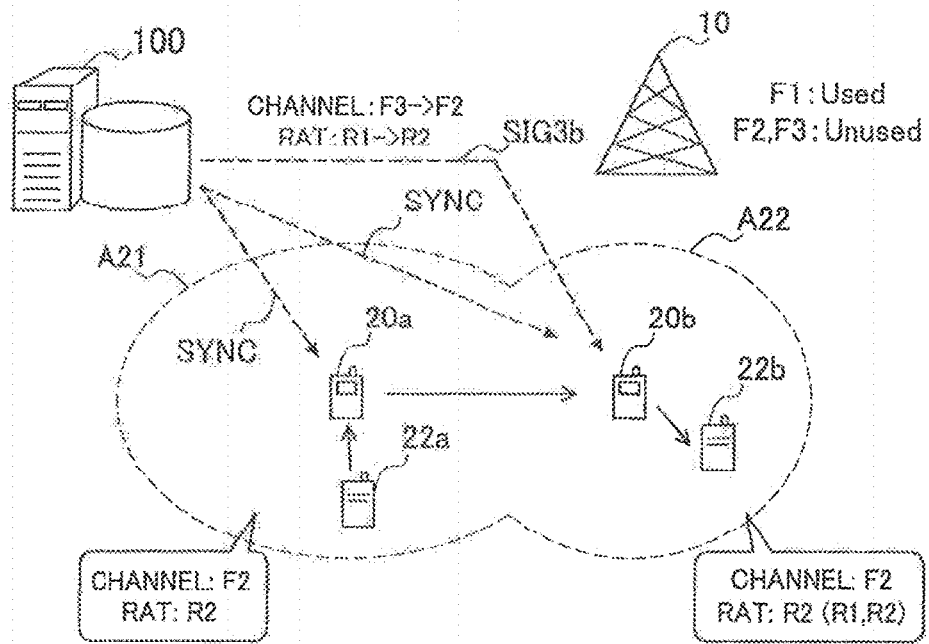
FIG. 13B is a second explanatory diagram illustrating the third scenario of the communication control process related to one embodiment.

FIG. 13A and FIG. 13B are explanatory diagrams illustrating a third scenario of the communication control process. Referring to FIG. 13A, the primary usage node 10, the secondary usage nodes 20*a* and 20*b*, and the communication control device 100 are shown again.

Like in the previous scenarios, even in this scenario, a frequency band including the channels F1, F2 and F3 is assigned to a first communication service provided by the primary usage node 10. Among these channels, the primary usage node 10 is using the channel F1. On the other hand, the channels F2 and F3 are not being used.

The secondary usage node 20*a* receives permission from a data server, which is not shown, and provides a second communication service on the channel F2 using the radio access technique R2. Also, the secondary usage node 20*b* receives permission from the data server, which is not shown, and provides a second communication service on the channel F3 using the radio access technique R1. Here, the secondary usage node 20*b* can use the radio access technique R2 in addition to the radio access technique R1. In this case, the channels that are used by the secondary usage nodes 20*a* and 20*b* are different, and thus large interference does not occur between the two second communication services. However, for example, the terminal device 22*a* that is located around the secondary usage node 20*a* and the terminal device 22*b* that is located around the secondary usage node 20*b* belong to the different communication services, and thus are not able to communicate with each other. For this reason, the secondary usage node 20*a* requests network expansion from the communication control device 100 according to the necessity for communication between these terminal devices (SIG3*a*). This request for network expansion denotes a request for an adjustment between the second communication services.

In this case, according to the process of determining a recommended service configuration exemplified in FIG. 10A to FIG. 10C, the communication control device 100 recommends, for example, that the secondary usage node 20*b* switch the radio access technique from R1 to R2 and also use the channel F2 (SIG3*b*). Also, the communication control device 100 supplies a synchronization signal (SYNC) for synchronizing the secondary usage nodes 20*a* and 20*b*. In this way, the secondary usage nodes 20*a* and 20*b* form a mesh network using the common radio access technique R2 and the common channel F2. As a result, the secondary usage nodes 20*a* and 20*b* relay signals transmitted/received between the terminal devices 22*a* and 22*b*, and communication is enabled between the terminal devices 22*a* and 22*b*.

[4-4. Fourth Scenario]

Figure 14A:
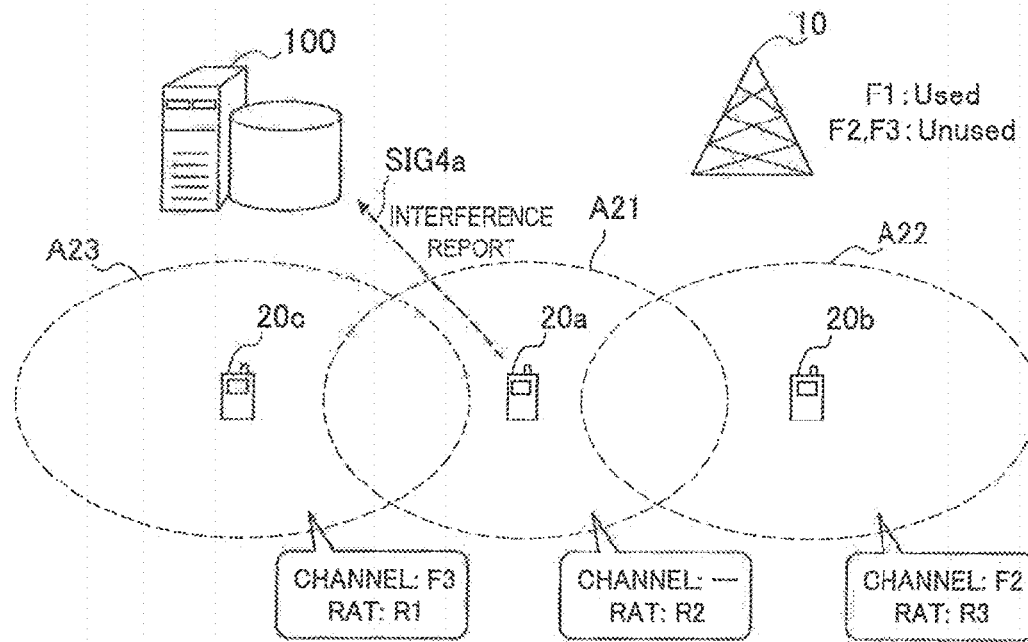
FIG. 14A is a first explanatory diagram illustrating a fourth scenario of the communication control process related to one embodiment.
Figure 14B:
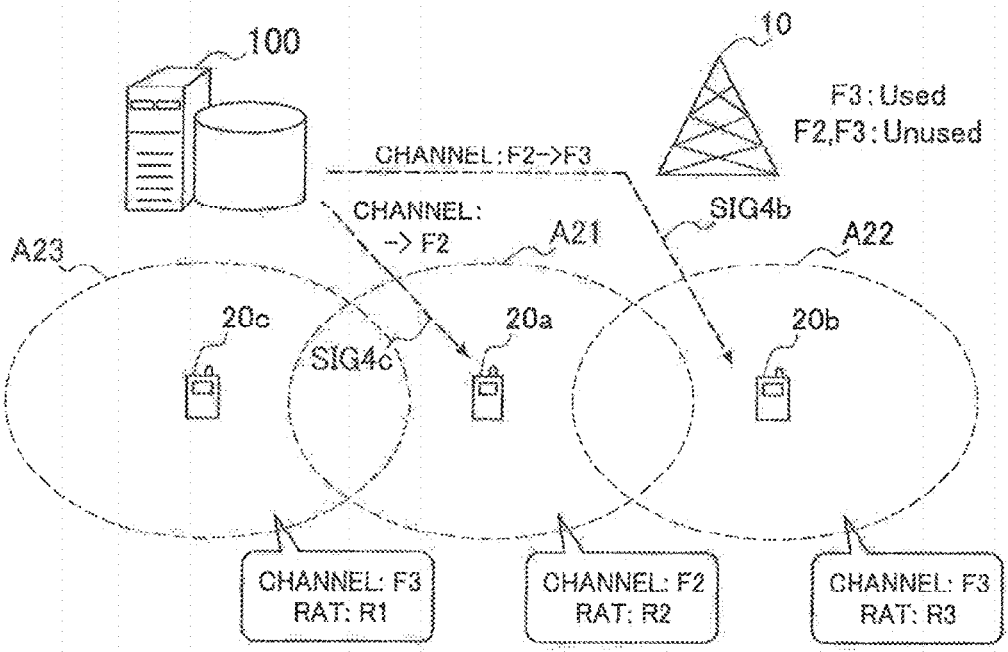
FIG. 14B is a second explanatory diagram illustrating the fourth scenario of the communication control process related to one embodiment.

FIG. 14A and FIG. 14B are explanatory diagrams illustrating a fourth scenario of the communication control process. Referring to FIG. 14A, the primary usage node 10, secondary usage nodes 20*a*, 20*b* and 20*c*, and the communication control device 100 are shown.

Like in the previous scenarios, even in this scenario, a frequency band including the channels F1, F2 and F3 is assigned to a first communication service provided by the primary usage node 10. Among these channels, the primary usage node 10 is using the channel F1. On the other hand, the channels F2 and F3 are not being used.

The secondary usage node 20b receives permission from a data server, which is not shown, and provides a second communication service on the channel F2 using a radio access technique R3. Also, the secondary usage node 20c receives permission from the data server, which is not shown, and provides a second communication service on the channel F3 using the radio access technique R1.

Furthermore, in this scenario, the secondary usage node 20a will receive permission from the data server, which is not shown, and provide a second communication service using the radio access technique R2. Permissible channel information allowed by the data server includes the channels F2 and F3. However, even when the secondary usage node 20a uses any of the channels F2 and F3, it is not possible to start the second communication service due to interference caused by signals from the secondary usage nodes 20b and 20b located around it. For this reason, the secondary usage node 20a reports that interference has occurred to the communication control device 100 (SIG4a).

In this case, according to the process of determining a recommended service configuration exemplified in FIG. 10A to FIG. 10C, the communication control device 100 recommends, for example, that the secondary usage node 20b use the channel 13 (SIG4b). This is because a location relationship between a service area A22 of the secondary usage node 20b and a service area A23 of the secondary usage node 20c corresponds to class C described above, and the secondary usage node 20c is using the channel F3. Also, the communication control device 100 recommends, for example, that the secondary usage node 20a use the channel F2 (SIG4c). In this way, the secondary usage node 20a can avoid interference and start secondary usage using the channel F2 that is different from the channels used by the secondary usage nodes 20b and 20c.

[4-5. Fifth Scenario]

Figure 15A:
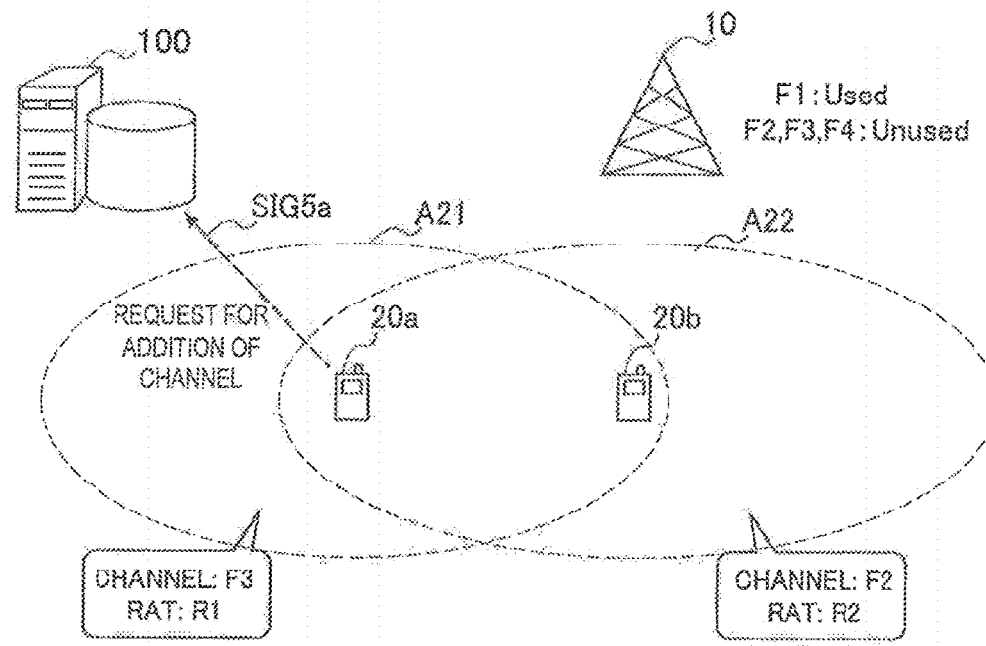
FIG. 15A is a first explanatory diagram illustrating a fifth scenario of the communication control process related to one embodiment.
Figure 15B:
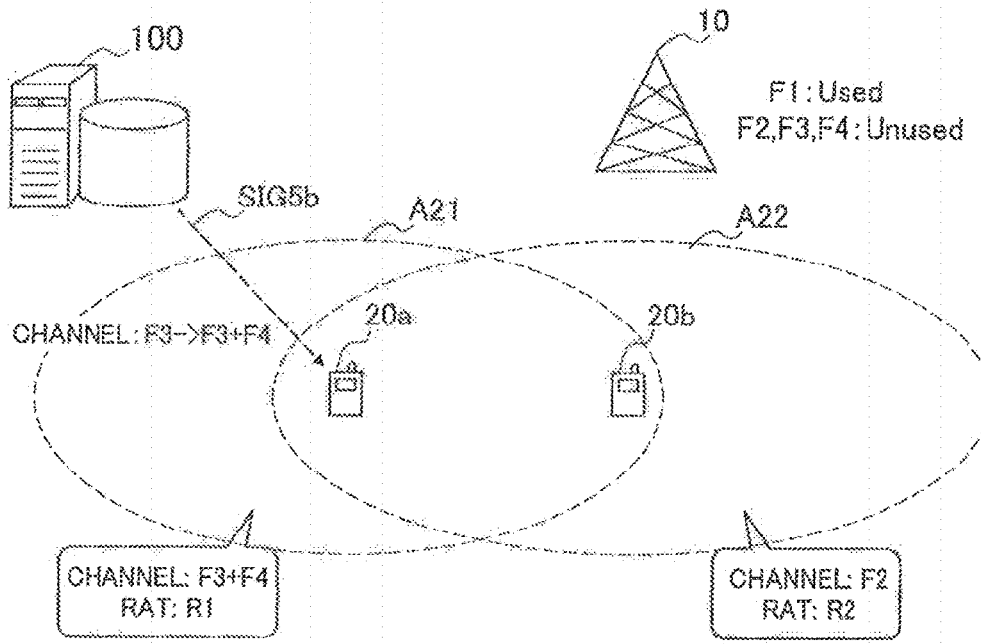
FIG. 15B is a second explanatory diagram illustrating the fifth scenario of the communication control process related to one embodiment.

FIG. 15A and FIG. 15B are explanatory diagrams illustrating a fifth scenario of the communication control process. Referring to FIG. 15A, the primary usage node 10, the secondary usage nodes 20a and 20b, and the communication control device 100 are shown.

In this scenario, a frequency band including channels F1, F2, F3 and F4 is assigned to a first communication service provided by the primary usage node 10. Among these channels, the primary usage node 10 is using the channel F1. On the other hand, the channels 12, F3 and F4 are not being used.

The secondary usage node 20a receives permission from a data server, which is not shown, and provides a second communication service on the channel F3 using the radio access technique R1. Also, the secondary usage node 20b receives permission from the data server, which is not shown, and provides a second communication service on the channel F2 using the radio access technique R2. In this case, the channels that are used by the secondary usage nodes 20a and 20b are different, and thus large interference does not occur between the two second 15i communication services. Here, it is assumed that, in the second communication service provided by, for example, the secondary usage node 20a, needs of an application for, for example, a high data rate have been generated. Thus, in order to extend a band of the second communication service and improve a data rate, the secondary usage node 20a requests addition of a channel from the communication control device 100 (SIG5a). This request for addition of a channel denotes a request for an adjustment between the second communication services.

In this case, according to the process of determining a recommended service configuration exemplified in FIG. 10A to FIG. 10C, the communication control device 100 recommends, for example, that the secondary usage node 20a use the channels F3 and F4 that are not being used by the secondary usage node 20b (SIG5b). As a result, the secondary usage node 20a can provide the second communication service in a wider band than the previous band, that is, at a higher data rate than the previous data rate, using the channels F3 and F4.

<5. Summarization>

Thus far, one embodiment of the present disclosure has been described with reference to FIG. 1 to FIG. 15B. In the above-described embodiment, the communication control device 100 recommends a radio access technique or a channel to be used to at least one secondary usage node on the basis of a location relationship between service areas of two or more second communication services and radio access techniques that can be used by secondary usage nodes providing the second communication services. Accordingly, it is possible to adjust a configuration for secondary usage between a plurality of second communication services. In particular, when a frequency band is secondarily used, there are many cases in which it is not found in advance what kind of radio access technique each secondary usage node supports. Also, to give each secondary usage node a function for performing an adjustment between second communication services is not practical in terms of cost, and makes it difficult to ensure neutrality of the adjustment. Accordingly, provision of the neutral communication control device 100 that collects information about each secondary usage node such as a radio access technique, and the like and performs an adjustment between second communication services is useful in terms of cost and also neutrality of the adjustment.

Also, in the above-described embodiment, the communication control device 100 selects a channel that is recommended to each secondary usage node from among channels that are allowed for the secondary usage node to use. Accordingly, when the communication control device 100 performs an adjustment, there is no risk of interfering with a first communication service or other communication services that can be managed around the corresponding secondary usage node.

Furthermore, in the above-described embodiment, when a secondary usage node detects interference between second communication services, a configuration of the second communication services can be changed to avoid the interference. When the secondary usage node requests expansion of a service area, the configuration of the second communication services can be changed to expand the service area. When the secondary usage node requests expansion of a band, the band of a second communication service can be expanded without newly causing interference. In this way, users' opportunities for secondary usage increase, and efficiency in frequency usage improves.

In addition, a control process of the communication control device 100 and the secondary usage nodes 20 described in this specification can be implemented using software. Programs constituting the software that implements the aforementioned control process are contained in advance on a storage medium installed in or outside each device. Each program is read, for example, by a Random Access Memory (RAM) upon execution and executed by a processor such as a Central Processing Unit (CPU) or the like.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Primary usage node
20 Secondary usage node
40 Data server
100 Communication control device
110 Communication unit (communication control device)
120 Storage unit (communication control device)
130 Estimation unit (communication control device)
140 Control unit (communication control device)
210 First communication unit (secondary usage node)
220 Second communication unit (secondary usage node)
230 Storage unit (secondary usage node)
240 Secondary usage control unit (secondary usage node)

The invention claimed is:

1. A communication control system for controlling communication of secondary usage nodes providing at least one or more second communication services using at least a part of a frequency band assigned to a first communication service, the communication control system comprising:
  a receiver configured to receive location information of at least one of the secondary usage nodes and access technique information indicating a radio access technique usable by at least one of the secondary usage nodes;
  circuitry configured to identify at least two or more service areas of the one or more second communication services and determine whether a reconfiguration of at least one of the secondary usage nodes is necessary; and
  a transmitter configured to transmit a message for the reconfiguration, the message including information indicating a power limit for at least one of the secondary usage nodes;
  wherein the circuitry is further configured to identify the at least two or more service areas of the second communication services based on the received location information of the at least one of the secondary usage nodes.

2. The communication control system of claim 1, wherein the information indicating a power limit comprises information identifying a restricted channel for use by the at least one of the secondary usage nodes, which restricted channel is limited to a lower transmission power than a normal channel usable by the secondary usage nodes.

3. The communication control system of claim 1, wherein the circuitry is further configured to determine whether the reconfiguration of the at least one of the secondary usage nodes is necessary in response to an adjustment request received from one or more of the secondary usage nodes.

4. The communication control system of claim 1, wherein the circuitry comprises a central processing unit.

5. The communication control system of claim 1, wherein:
  the receiver is further configured to receive from the at least one of the secondary usage nodes permissible channel information indicating at least one channel that the at least one of the secondary usage nodes is allowed to use; and
  the circuitry is further configured to select a channel to recommend to the at least one of the secondary usage nodes from among channels indicated by the received permissible channel information.

6. The communication control system of claim 1, wherein, in response to a request from a secondary usage node detecting interference between second communication services, the circuitry is configured to include in the message a recommended radio access technique or a recommended channel.

7. The communication control system of claim 1, wherein, in response to a request from a secondary usage node requesting expansion of a service area, the circuitry is configured to include in the message a recommended radio access technique or a recommended channel.

8. The communication control system of claim 1, wherein, in response to a request from a secondary usage node requesting expansion of a band, the circuitry is configured to include in the message a recommended channel.

9. The communication control system of claim 1, wherein, when there are a plurality of recommendable channels, the circuitry is configured to preferentially include in the message information recommending a channel whose transmission power has no limitation.

10. A communication control method for controlling communication of secondary usage nodes providing at least one or more second communication services using at least a part of a frequency band assigned to a first communication service, the method comprising:
  receiving location information of at least one of the secondary usage nodes and access technique information indicating a radio access technique usable by at least one of the secondary usage nodes;
  identifying at least two or more service areas of the one or more second communication services and determining whether a reconfiguration of at least one of the secondary usage nodes is necessary; and
  transmitting a message for the reconfiguration, the message including information indicating a power limit for at least one of the secondary usage nodes;
  wherein the identifying of the at least two or more service areas of the second communication services is performed based on the received location information of the at least one of the secondary usage nodes.

11. The communication control method of claim 10, wherein the information indicating a power limit comprises information identifying a restricted channel for use by the at least one of the secondary usage nodes, which restricted channel is limited to a lower transmission power than a normal channel usable by the secondary usage nodes.

12. The communication control method of claim 10, wherein the determining whether the reconfiguration of the at least one of the secondary usage nodes is necessary is performed in response to an adjustment request received from one or more of the secondary usage nodes.

13. The communication control method of claim 10, further comprising:
  receiving from the at least one of the secondary usage nodes permissible channel information indicating at least one channel that the at least one of the secondary usage nodes is allowed to use; and
  selecting a channel to recommend to the at least one of the secondary usage nodes from among channels indicated by the received permissible channel information.

14. The communication control method of claim 10, further comprising:
  in response to a request from a secondary usage node detecting interference between second communication services, including in the message a recommended radio access technique or a recommended channel.

15. The communication control method of claim 10, further comprising:
   in response to a request from a secondary usage node requesting expansion of a service area, including in the message a recommended radio access technique or a recommended channel.

16. The communication control method of claim 10, further comprising:
   in response to a request from a secondary usage node requesting expansion of a band, including in the message a recommended channel.

17. The communication control method of claim 10, wherein, when there are a plurality of recommendable channels, preferentially including in the message information recommending a channel whose transmission power has no limitation.

* * * * *